(12) United States Patent
Buermann et al.

(10) Patent No.: US 7,088,440 B2
(45) Date of Patent: Aug. 8, 2006

(54) METHOD AND APPARATUS FOR DETERMINING ABSOLUTE POSITION OF A TIP OF AN ELONGATE OBJECT ON A PLANE SURFACE WITH INVARIANT FEATURES

(75) Inventors: Dale H. Buermann, Los Altos, CA (US); Michael J. Mandella, Palo Alto, CA (US); Stewart R. Carl, Palo Alto, CA (US); Guanghua G. Zhang, San Jose, CA (US); Hector H. Gonzalez-Banos, Mountain View, CA (US)

(73) Assignee: Electronic Scripting Products, Inc., Palo Alto, CA (US)

( * ) Notice: Subject to any disclaimer, the term of this patent is extended or adjusted under 35 U.S.C. 154(b) by 174 days.

(21) Appl. No.: 10/745,371

(22) Filed: Dec. 22, 2003

(65) Prior Publication Data

US 2005/0133700 A1 Jun. 23, 2005

(51) Int. Cl.
*G01B 11/26* (2006.01)
(52) U.S. Cl. .................................................. 356/138
(58) Field of Classification Search ................ 382/118; 341/5; 178/18.01, 18.09
See application file for complete search history.

(56) References Cited

U.S. PATENT DOCUMENTS

| 4,471,162 | A | 9/1984 | Aono et al. |
| 4,896,543 | A | 1/1990 | Gullman |
| 5,103,486 | A | 4/1992 | Grippi |
| 5,215,397 | A | 6/1993 | Taguchi et al. |
| 5,226,091 | A | 7/1993 | Howell et al. |

(Continued)

OTHER PUBLICATIONS

Sinzinger et al., Microoptics, Wiley VCH, 1999, pp. 247-249.

*Primary Examiner*—Gregory J. Toatley, Jr.
*Assistant Examiner*—Isiaka O. Akanbi
(74) *Attorney, Agent, or Firm*—Lumen Intellectual Property Services, Inc.

(57) ABSTRACT

A method and apparatus for determining a pose of an elongate object and an absolute position of its tip while the tip is in contact with a plane surface having invariant features. The surface and features are illuminated with a probe radiation and a scattered portion, e.g., the back-scattered portion, of the probe radiation returning from the plane surface and the feature to the elongate object at an angle $\tau$ with respect to an axis of the object is detected. The pose is derived from a response of the scattered portion to the surface and the features and the absolute position of the tip on the surface is obtained from the pose and knowledge about the feature. The probe radiation can be directed from the object to the surface at an angle $\sigma$ to the axis of the object in the form of a scan beam. The scan beam can be made to follow a scan pattern with the aid of a scanning arrangement with one or more arms and one or more uniaxial or biaxial scanners. Angle $\tau$ can also be varied, e.g., with the aid of a separate or the same scanning arrangement as used to direct probe radiation to the surface. The object can be a pointer, a robotic arm, a cane or a jotting implement such as a pen, and the features can be edges, micro-structure or macro-structure belonging to, deposited on or attached to the surface which the tip of the object is contacting.

50 Claims, 24 Drawing Sheets

U.S. PATENT DOCUMENTS

| | | |
|---|---|---|
| 5,294,792 A | 3/1994 | Lewis et al. |
| 5,333,209 A | 7/1994 | Sinden et al. |
| 5,434,371 A | 7/1995 | Brooks |
| 5,484,966 A | 1/1996 | Segen |
| 5,517,579 A | 5/1996 | Baron et al. |
| 5,548,092 A | 8/1996 | Shriver |
| 5,577,135 A | 11/1996 | Grajski et al. |
| 5,581,276 A | 12/1996 | Cipolla et al. |
| 5,587,558 A | 12/1996 | Matsushima |
| 5,587,560 A | 12/1996 | Crooks et al. |
| 5,652,412 A | 7/1997 | Lazzouni et al. |
| 5,661,506 A | 8/1997 | Lazzouni et al. |
| 5,717,168 A | 2/1998 | DeBuisser et al. |
| 5,737,740 A | 4/1998 | Henderson et al. |
| 5,750,939 A | 5/1998 | Makinwa et al. |
| 5,774,602 A | 6/1998 | Taguchi et al. |
| 5,781,661 A | 7/1998 | Hiraiwa et al. |
| 5,902,968 A | 5/1999 | Sato et al. |
| 5,939,702 A | 8/1999 | Knighton et al. |
| 5,959,617 A | 9/1999 | Bird et al. |
| 5,960,124 A | 9/1999 | Taguchi et al. |
| 5,977,958 A | 11/1999 | Baron et al. |
| 6,031,936 A | 2/2000 | Nakamura |
| 6,044,165 A | 3/2000 | Perona et al. |
| 6,050,490 A | 4/2000 | Leichner et al. |
| 6,081,261 A | 6/2000 | Wolff et al. |
| 6,100,877 A | 8/2000 | Chery et al. |
| 6,104,387 A | 8/2000 | Chery et al. |
| 6,104,388 A | 8/2000 | Nagai et al. |
| 6,108,444 A | 8/2000 | Syeda-Mahmood |
| 6,111,565 A | 8/2000 | Chery et al. |
| 6,124,847 A | 9/2000 | Chery et al. |
| 6,130,666 A | 10/2000 | Persidsky |
| 6,147,681 A | 11/2000 | Chery et al. |
| 6,153,836 A | 11/2000 | Goszyk |
| 6,177,927 B1 | 1/2001 | Chery et al. |
| 6,181,329 B1 | 1/2001 | Stork et al. |
| 6,184,873 B1 | 2/2001 | Ward et al. |
| 6,188,392 B1 | 2/2001 | O'Connor et al. |
| 6,213,398 B1 | 4/2001 | Southworth et al. |
| 6,243,503 B1 | 6/2001 | Teufel et al. |
| 6,262,719 B1 | 7/2001 | Bi et al. |
| 6,292,177 B1 | 9/2001 | Holtzman et al. |
| 6,330,359 B1 | 12/2001 | Kawabata |
| 6,334,003 B1 | 12/2001 | Yokota |
| 6,335,723 B1 | 1/2002 | Wood et al. |
| 6,335,724 B1 | 1/2002 | Takekawa et al. |
| 6,335,727 B1 | 1/2002 | Morishita et al. |
| 6,348,914 B1 | 2/2002 | Tuli |
| 6,396,481 B1 | 5/2002 | Challa et al. |
| 6,414,673 B1 | 7/2002 | Wood et al. |
| 6,421,042 B1 | 7/2002 | Omura et al. |
| 6,422,775 B1 | 7/2002 | Bramlett et al. |
| 6,424,340 B1 | 7/2002 | Holtzman et al. |
| 6,429,856 B1 | 8/2002 | Omura et al. |
| 6,437,314 B1 | 8/2002 | Usuda et al. |
| 6,456,749 B1 | 9/2002 | Kasabach et al. |
| 6,492,981 B1 | 12/2002 | Stork et al. |
| 6,498,604 B1 | 12/2002 | Jensen |
| 6,710,798 B1 * | 3/2004 | Hershel et al. ............... 348/87 |
| 2002/0001029 A1 | 1/2002 | Abe |
| 2002/0028017 A1 | 3/2002 | Munich |
| 2002/0118181 A1 | 8/2002 | Sekendur |
| 2002/0148655 A1 | 10/2002 | Cho et al. |
| 2002/0158848 A1 | 10/2002 | Sekendur |
| 2002/0163511 A1 | 11/2002 | Sekendur |

* cited by examiner

METHOD AND APPARATUS FOR DETERMINING ABSOLUTE POSITION OF A TIP OF AN ELONGATE OBJECT ON A PLANE SURFACE WITH INVARIANT FEATURES

FIELD OF THE INVENTION

The present invention relates generally to determining a pose of an elongate object and an absolute position of its tip on a plane surface with invariant features and it applies in particular to elongate objects such as a pointers or jotting implements.

BACKGROUND OF THE INVENTION

When an object moves with respect to stationary references such as a ground plane, fixed points, lines or reference surfaces, knowledge of the object's absolute position with respect to these references can be used to derive a variety of its parameters of motion as well as its pose and absolute position with respect to any of these stationary references. Over time, many useful coordinate systems and methods have been developed to track the pose and absolute position of objects and to parameterize their equations of motion. For a theoretical background the reader is referred to textbooks on classical mechanics such as Goldstein et al., Classical Mechanics, $3^{rd}$ Edition, Addison Wesley 2002.

In one field it is important to know the absolute position of a tip of an elongate object while the tip is in contact with a plane surface. Now, various types of elongate objects can benefit from knowledge of their pose, and more precisely the absolute position of their tip while in contact with a plane surface. These objects include walking canes when in touch with the ground, pointers when in touch with a display, a screen or a projection surface, robotic arms when in touch with a plane surface, writing devices when in touch with a writing surface, and styluses when in touch with an input screen or pad.

The need to determine the absolute position of the tip or nib of an input device shaped as elongate objects is related to data processing. In particular, the absolute position of the tip has to be known in order to analyze the information written or traced by the user. The art of writing and drawing is ancient and rich in traditions. Over the ages various types of implements have been used for writing down words as well as drawing, sketching, marking and painting.

Most of these implements have a generally elongate shape, an essentially round cross-section and they are terminated at one end by a writing nib or tip. They are typically designed to be hand-held and operated by the user's preferred hand (e.g., by the right hand for right-handed persons). More specifically, the user moves the implement across a writing or jotting surface such that the writing nib leaves a visible trace marking its motion on the surface. The marking can be produced by a material deposited from the nib, e.g., through abrasion of the marking material (such as charcoal or graphite in the case of a pencil) or by direct wetting of the surface by an ink (as in the case of the pen). The marking can also include any other physical trace left on the surface.

The most widely used writing and drawing implements include pens and pencils while the most convenient jotting surfaces include sheets of paper of various sizes and other generally planar objects capable of being marked. In fact, despite the tremendous advances in sciences and engineering, pen and paper remain among the simplest and most intuitive devices for writing, drawing, marking and sketching, even in the electronic age.

The challenge of communicating with electronic devices is in the very input interface to the electronic device. For example, computers take advantage of input devices such as keyboards, buttons, pointer devices, mice and various other types of apparatus that encode motion and convert it to data that the computer can process. Unfortunately, none of these devices are as user-friendly and accepted as pen and paper.

This input interface problem has been recognized in the prior art and a variety of solutions have been proposed. Most of these solutions attempt to derive electronic, i.e., digital data from the motions of a pen on paper or some other writing surface, e.g., a writing tablet. Of these prior art teachings, the following references are of note:

U.S. Pat. Nos:

| | | | | |
|---|---|---|---|---|
| 4,471,162 | 4,896,543 | 5,103,486 | 5,215,397 | 5,226,091 |
| 5,294,792 | 5,333,209 | 5,434,371 | 5,484,966 | 5,517,579 |
| 5,548,092 | 5,577,135 | 5,581,276 | 5,587,558 | 5,587,560 |
| 5,652,412 | 5,661,506 | 5,717,168 | 5,737,740 | 5,750,939 |
| 5,774,602 | 5,781,661 | 5,902,968 | 5,939,702 | 5,959,617 |
| 5,960,124 | 5,977,958 | 6,031,936 | 6,044,165 | 6,050,490 |
| 6,081,261 | 6,100,877 | 6,104,387 | 6,104,388 | 6,108,444 |
| 6,111,565 | 6,124,847 | 6,130,666 | 6,147,681 | 6,153,836 |
| 6,177,927 | 6,181,329 | 6,184,873 | 6,188,392 | 6,213,398 |
| 6,243,503 | 6,262,719 | 6,292,177 | 6,330,359 | 6,334,003 |
| 6,335,723 | 6,335,724 | 6,335,727 | 6,348,914 | 6,396,481 |
| 6,414,673 | 6,421,042 | 6,422,775 | 6,424,340 | 6,429,856 |
| 6,437,314 | 6,456,749 | 6,492,981 | 6,498,604 | |

U.S. Published Applications:

| | | | | |
|---|---|---|---|---|
| 2002-0001029 | 2002-0028017 | 2002-0118181 | 2002-0148655 | 2002-0158848 |
| 2002-0163511 | | | | |

European Patent Specifications:
0,649,549 B1
International Patent Applications:

| | | | |
|---|---|---|---|
| WO 02/017222 A2 | WO 02/058029 A2 | WO 02/064380 A1 | WO 02/069247 A1 |
| WO 02/084634 A1 | | | |

Although the above-referenced teachings provide a number of approaches they are cumbersome to the user. Many of these approaches provide the user with pens that are difficult to handle, impose special writing and/or monitoring conditions and/or they require cumbersome auxiliary systems and devices to track and digitize the information written on the writing surface. Thus, the problem of a user-friendly input interface based on a writing implement has not been solved.

OBJECTS AND ADVANTAGES

In view of the shortcomings of the prior art, it is the object of the invention to provide an apparatus and method for determining the pose of an elongate object and an absolute position of its tip while it is contacting a plane surface endowed with invariant features. More specifically, it is an object of the invention to ensure that the apparatus and method can be used in a jotting implement such as a pen, pencil or stylus operating on a plane surface.

It is another object of the invention to ensure that the apparatus is small and compatible with a self-contained jotting implement such as a pen or stylus.

These and numerous other advantages will become apparent upon reading the detailed description in conjunction with the drawing figures.

SUMMARY OF THE INVENTION

The present invention provides a method for determining a pose of an elongate object and the absolute position of its tip while the tip is in contact with a plane surface endowed with one or more invariant features. The method provides for illuminating the plane surface and the invariant feature with a probe radiation and detecting a scattered portion of the probe radiation returning from the plane surface and the invariant feature to the elongate object at an angle $\tau$ with respect to an axis of the elongate object. The pose is derived from a response of the scattered portion to the surface and the invariant feature or features. The absolute position of the tip on the surface is obtained from the pose and knowledge about the invariant feature.

There are a wide variety of methods and apparatus for practicing the invention. In some embodiments the probe radiation is directed from the elongate object to the surface at an angle $\sigma$ to the axis of the elongate object. In some of these embodiments or in other embodiments the scattered portion is a back-scattered portion and angle $\tau$ corresponds to a back-scatter angle. It is convenient to measure angle $\tau$ with respect to the same axis of the elongate object as angle $\sigma$. Furthermore, the response from which the absolute position is derived can be an intensity variation in the scattered or back-scattered portion.

It is preferred that the probe radiation be directed at the plane surface and the invariant features in the form of a scan beam such as a collimated scan beam. The angle $\sigma$ at which the scan beam of probe radiation is directed is varied in a predefined manner such that the scan beam follows a scan pattern. Such variation of angle $\sigma$ can be achieved by an appropriate scanning arrangement having, but not limited to uniaxial and biaxial scan mirrors and drivers. In some embodiments the scan pattern is a uniaxial scan pattern. In other embodiments the scan pattern is a biaxial scan pattern. One example of appropriate biaxial scan patterns are raster patterns and Lissajous figures. In some embodiments angle $\tau$ is also varied. For example, angle $\tau$ is varied with the aid of a scanning arrangement, e.g., the same scanning arrangement as used for varying angle $\sigma$. The variation of angle $\tau$ can follow a scan pattern such as a uniaxial or biaxial scan pattern.

The invariant features on the plane surface depend on the type of surface with which the tip of the elongate object is in contact. For example, the invariant features can be one or more edges of the plane surface when the surface belongs to a planar object. In a preferred embodiment of the method, the elongate object is a jotting implement such as a pen, pencil or stylus and the plane surface is a jotting surface. For example, the jotting surface is a screen, a pad or a paper surface. In the case of a paper surface, the invariant feature can be a micro-structure of the paper surface. Alternatively, the invariant feature can be a macro-structure on the paper surface. Appropriate macro-structure includes but is not limited to markings made by the tip of the jotting implement or pre-existing markings. In some embodiments the invariant features can comprise retroreflectors, e.g., a retroreflective surface portion. In still other embodiments invariant features are temporary invariant features. For example, when the plane surface is a screen or a pad, a projected temporary feature can be used as an invariant feature. Such projected temporary feature can be produced with the aid of the probe radiation. Some projected temporary features can even contain user information. Also, projected temporary features can be produced by scanning the probe radiation, e.g., using the scanning arrangement.

The scan beam directed at the plane surface and invariant features can be made up of a number of component beams. Likewise, the scattered portion can be received in parts or in sub-portions. The step of deriving the pose and obtaining the absolute position of the tip is generally based on geometry. In some embodiments the step of deriving includes a temporal analysis of the scattered portion. Specifically, the temporal analysis can include a phase analysis of the detected scattered portion.

In the process of determining absolute position of the tip of the elongate object it is convenient to describe the pose with the aid of an inclination angle $\theta$ between the axis of the elongate object and a normal to the plane surface. In fact, it is preferable to employ Euler angles $(\phi,\theta,\psi)$ in describing the pose of the elongate object, such that inclination angle $\theta$ is the second Euler angle.

In some embodiments the elongate object is a pointer, a robotic arm or a cane. In these cases the invariant features can also be edges, micro-structure or macro-structure belonging to, deposited on or attached to the surface on which the tip of the pointer, robotic arm or cane is placed.

The invention also provides an apparatus for determining the pose of an elongate object and absolute position of its tip on a plane surface. The elongate object can be a jotting implement whose tip is a nib in contact with a plane surface having one or more invariant features. The apparatus has a source for illuminating the plane surface with a probe radiation. The source can be an emitter mounted on the elongate object or an ambient radiation source in which case the probe radiation is an ambient radiation. Further, the apparatus has a detector mounted on the elongate object for detecting a scattered portion of the probe radiation returning from the plane surface and the invariant features to the elongate object at an angle $\tau$ to an axis. Also provided is a computing unit for deriving the pose of the object and obtaining the absolute position of the tip on the plane surface.

Preferably, probe radiation is directed to the surface and invariant features in the form of a scan beam at an angle $\sigma$ to an axis, e.g., the center axis, of the elongate object. In the preferred embodiment the apparatus has a scanning arrangement for varying angle $\sigma$. In one specific embodiment, the scanning arrangement has a uniaxial scanner for varying angle $\sigma$ by introducing an x-deflection $\gamma_x$. This can be accomplished by equipping the uniaxial scanner with a scan arm with a uniaxial scan mirror and an X-driver for controlling the x-deflection $\gamma_x$. In another specific embodiment, the scanning arrangement has a biaxial scanner for varying angle $\sigma$ by introducing an x-deflection $\gamma_x$ and a y-deflection $\gamma_y$. The biaxial scanner can use for this purpose a scan arm having a biaxial scan mirror and an X-driver for controlling said x-deflection $\gamma_x$ and a Y-driver for controlling said y-deflection $\gamma_y$. When using scanning arrangements it is generally preferred to use a single frequency emitter generating probe radiation at a single frequency. A suitable single frequency emitter is a laser diode.

The emitter and the detector can be offset. Alternatively, they can be integrated. In some embodiments, the emitter has a number of component emitters for emitting a corresponding number of component beams. In the same or other embodiments, the detector has a number of component detectors for detecting sub-portions of the scattered portion.

In some embodiments the apparatus uses an optic for shaping the probe radiation into a scan beam such as a collimated scan beam. The apparatus can also use a scanning arrangement with a number of scan arms for shaping the probe radiation into a corresponding number of scan beams. The same or a different scanning arrangement can be used for varying angle τ.

The apparatus can be used with elongate objects such as pointers, robotic arms, canes and jotting implements. Some examples of suitable jotting implements include pens, pencils and styluses. When used in self-contained jotting implements, the computing unit is located on the elongate object.

The invention further provides an elongate object that can derive the absolute position of its tip on a plane surface by using the emitter, detector and computing unit. It should be noted that the probe radiation used by the elongate object can be an ambient radiation provided by an ambient radiation source that is not located on the elongate object.

In some embodiments the elongate object scans angle τ while probe radiation is the ambient radiation. For example, the ambient radiation is not projected from the elongate object but is rather provided by a separate ambient radiation source. In these embodiments invariant features can include any of the above invariant features including temporary invariant features e.g., projected features that are projected onto the plane surface.

For the purposes of the present invention, the position of the tip is an absolute position in the sense that it is expressed in world coordinates. In other words, the computing unit converts the position of the tip into world coordinates to obtain the absolute position. The details of the invention will now be described in detail with reference to the drawing figures.

DETAILED DESCRIPTION

Figure 1A:
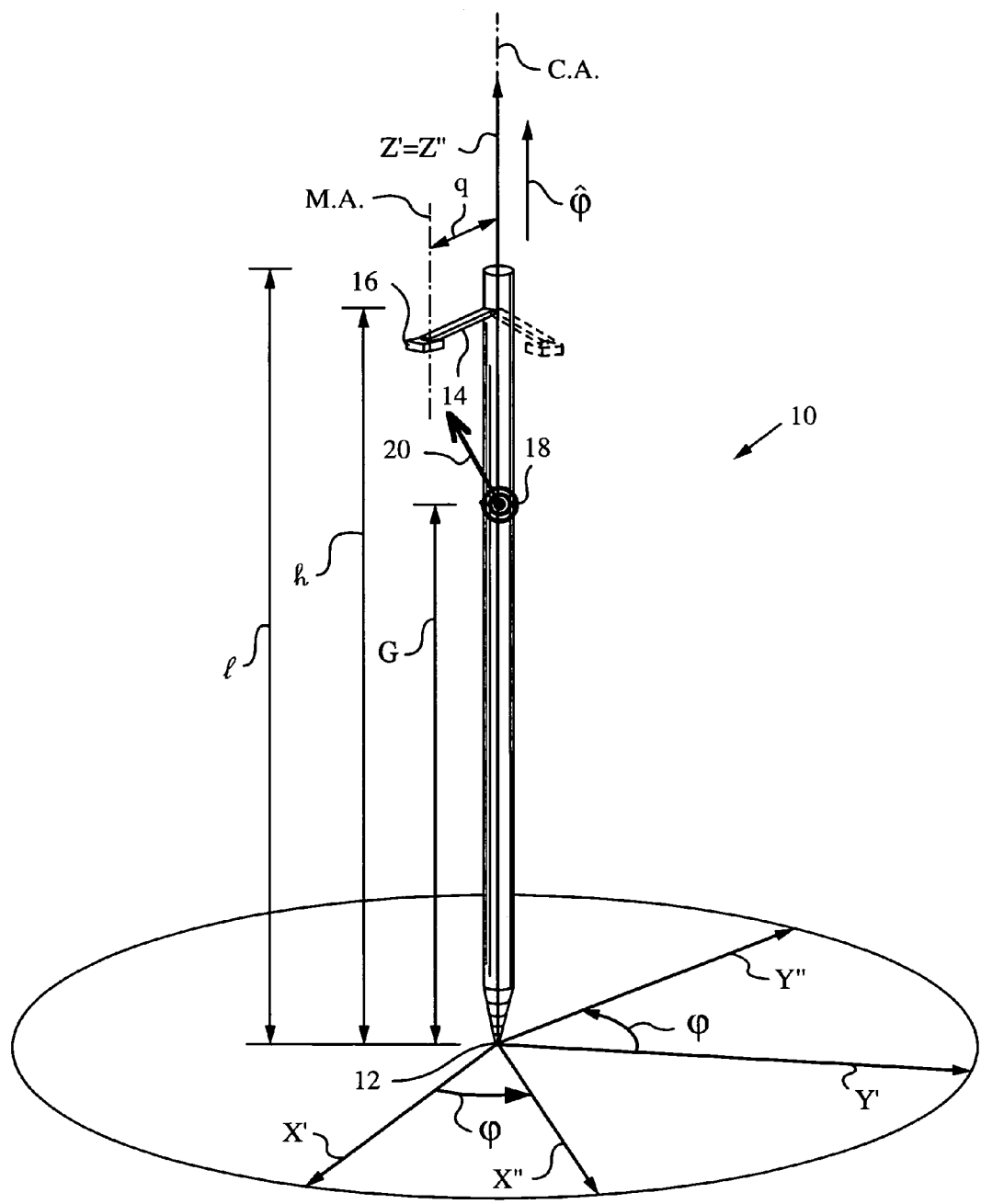
FIGS. 1A–C are diagrams illustrating Euler rotations of an elongate object with a single scan arm.

The present invention will be best understood by initially reviewing Euler rotations as used herein to describe the pose of an elongate object. FIG. 1A illustrates an elongate object 10 of length l with a tip 12 at the origin of non-rotated object coordinates (X',Y',Z'). An axis of object 10, in the present embodiment a center line or center axis denoted by C.A. is collinear with the Z' axis. Axis C.A. passes through tip 12 and the origin of non-rotated object coordinates (X',Y',Z'). A scan arm 14 of length q is mounted on object 10 at a height h perpendicular to axis C.A. Scan arm 14 carries a scan mirror 16 having a mirror axis M.A. that is parallel to axis C.A. when scan mirror 16 is in the resting or neutral position. A source or emitter 18 is mounted at height G for delivering a probe radiation 20 to scan mirror 16.

A person skilled in the art will appreciate that many conventions exist for describing rotations of object 10. In the convention adopted herein, scan arm 14 is initially aligned parallel with axis X' of non-rotated object coordinates. In the passive rotation convention used herein objects coordinates will be attached to object 10 while object 10 is rotated from initial upright position.

FIG. 1A illustrates a first counterclockwise rotation by first Euler angle φ of object coordinates (X',Y',Z') about the Z' axis. This rotation of the object coordinates does not affect the Z' axis so once rotated Z" axis is collinear with non-rotated Z' axis (Z"=Z'). On the other hand, axes X' and Y' are rotated by first Euler angle φ to yield once rotated axes X" and Y".

Figure 1B:
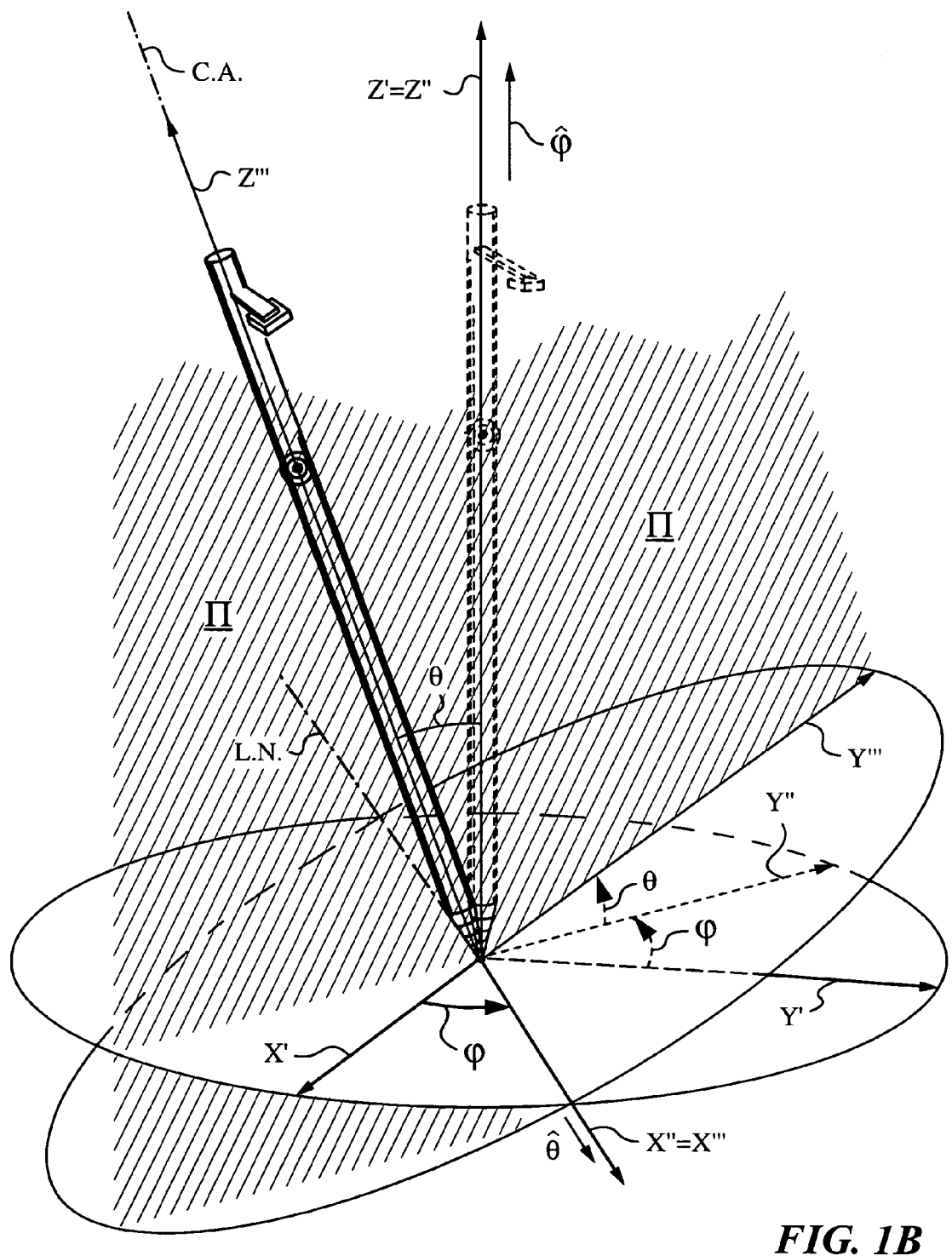

FIG. 1B illustrates a second counterclockwise rotation by second Euler angle θ applied to once rotated object coordinates (X",Y",Z"). This second rotation is performed about the once rotated X" axis and therefore it does not affect the X" axis (X'"=X"). On the other hand, axes Y" and Z" are rotated by second Euler angle θ to yield twice rotated axes Y'" and Z'". This second rotation is performed in a plane Π containing once rotated axes Y", Z" and twice rotated axes Y'", Z'". Note that axis C.A. of object 10 is rotated counterclockwise by second Euler angle θ in plane Π and remains collinear with twice rotated axis Z'".

Figure 1C:
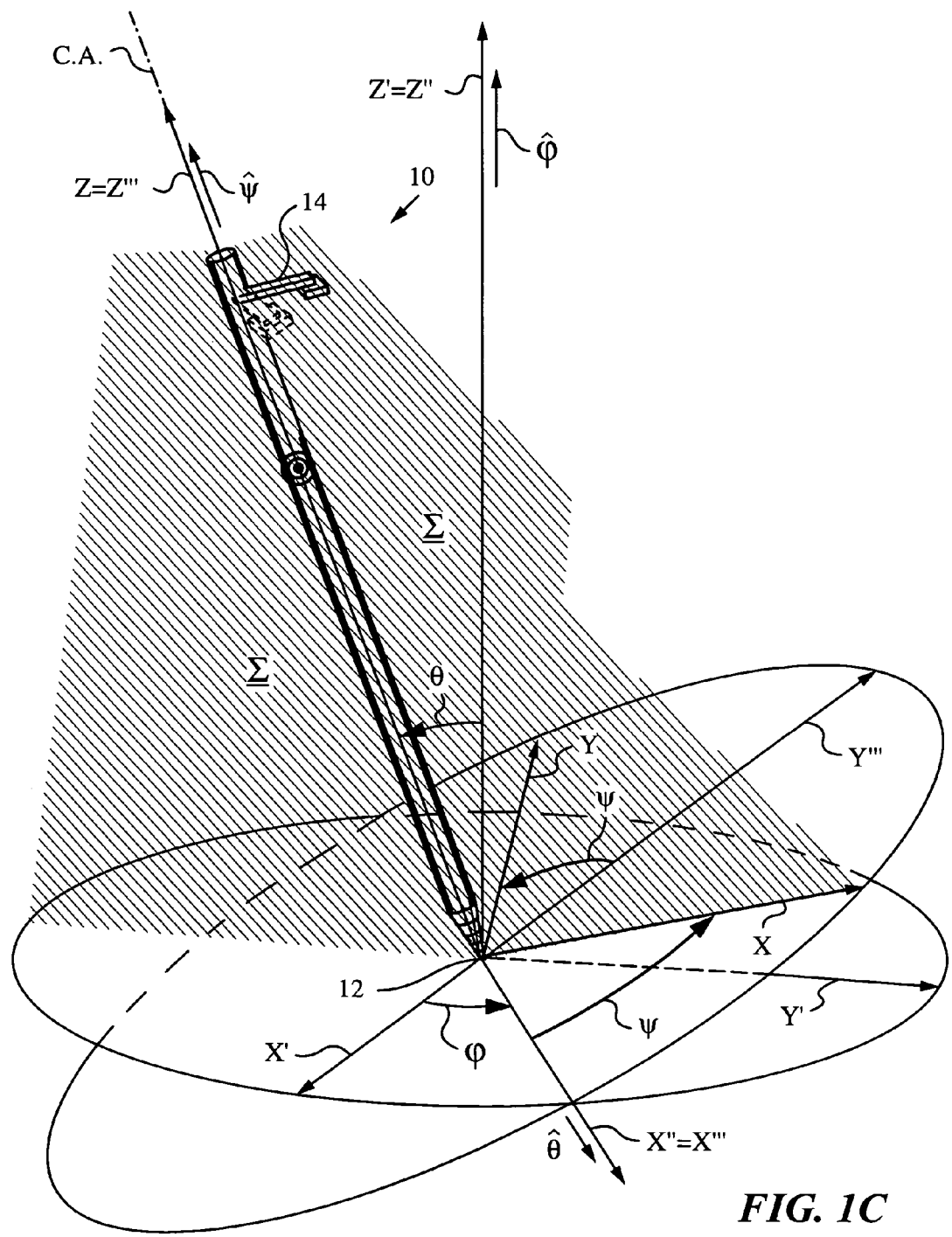

A third counterclockwise rotation by third Euler angle ψ is applied to twice rotated object coordinates (X'",Y'",Z'") as shown in FIG. 1C. Rotation by ψ is performed about twice rotated axis Z'" that is already collinear with object axis Z rotated by all three Euler angles. Meanwhile, twice rotated axes X'",Y'" are rotated by ψ to yield object axes X,Y rotated by all three Euler angles. Object axes X,Y,Z rotated by all three Euler angles φ, θ and ψ define Euler rotated object coordinates (X,Y,Z). Note that tip 12 of object 10 remains at the origin of all object coordinates during the Euler rotations. Also note that a plane Σ containing axis C.A. of object 10 and arm 14 is now at angle (π/2)−ψ to plane Π containing axis Z' and axis C.A.

Figure 2:
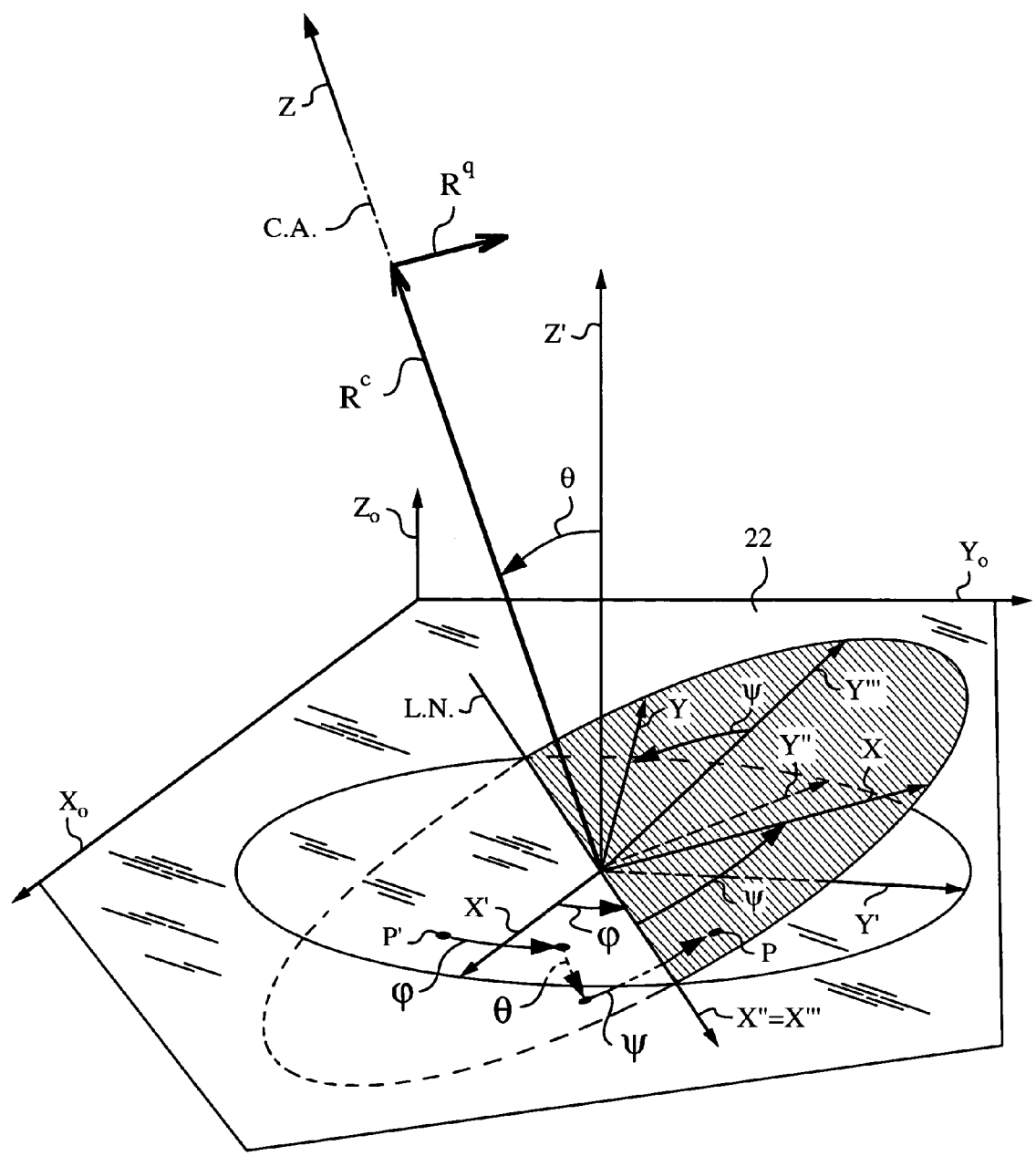
FIG. 2 is a diagram illustrating the coordinate transformation of a point in a world coordinate system undergoing Euler rotations.

In FIG. 2 object 10 is represented in a simplified form by a vector $R^c$ extending from tip 12 of object 10 to height h along axis C.A. and a vector $R^q$ extending from the tip of vector $R^c$ along arm 14 to the center of scan mirror 16. Object 10 has its tip 12 coincident with the tail of vector $R^c$ on a plane surface 22 defined by an $(X_o,Y_o)$ plane in world coordinates $(X_o,Y_o,Z_o)$. In the world coordinates object axis Z' prior to the three Euler rotations is normal to plane $(X_o,Y_o)$. Now, second Euler angle θ defines the only counterclockwise rotation of object coordinates that is not about an object Z axis (this second rotation is about the X"=X'" axis rather than axis Z', Z" or Z'"). Thus, Euler angle θ is an inclination angle θ between the completely Euler rotated object axis Z or axis C.A. and original object axis Z', which is normal to plane $(X_o,Y_o)$ at the point of contact of tip 12. This can also be seen by following the effects of three Euler rotations performed on points in non-rotated object plane (X',Y') rather than object coordinates. Thus, for example, following a point P' originally located in world plane $(X_o, Y_o)$ and coplanar with object plane (X',Y') prior to Euler rotations we notice that only second rotation by angle θ moves point P' out of plane $(X_o,Y_o)$ and into final Euler rotated object plane (X,Y).

Figure 3:
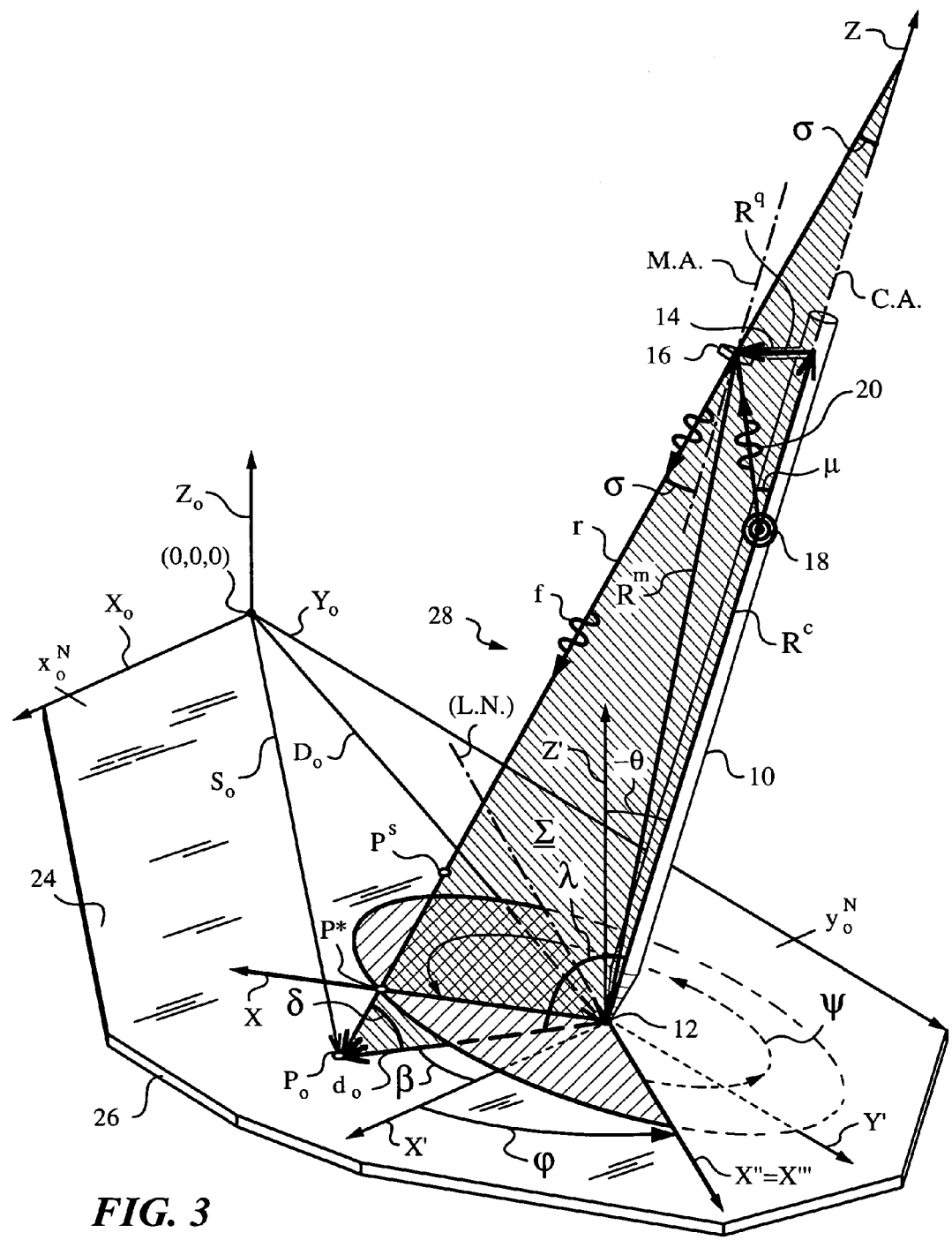
FIG. 3 is a diagram illustrating the localization of a scan point made by a scan beam emitted at a scan angle σ from the scan arm of the elongate object after it has been rotated by Euler angles (φ,θ,ψ).

FIG. 3 is a three-dimensional diagram illustrating elongate object 10 in Euler rotated coordinates (X,Y,Z). In this case the Euler angles are different from those in FIGS. 1A–C, 2; they are selected to produce a pose that better visualizes the scanning of probe radiation 20 by mirror 16. In addition, world plane $(X_o,Y_o)$ corresponds to a plane surface 24 of a substrate 26. For example, if object 10 is a pointer substrate 26 can be a screen or a pad, if object 10 is a jotting implement, e.g., a pen or pencil then substrate 26 can be a sheet of paper, and if it is a stylus then substrate 26 can be a screen of a digital input device. The origin $X_o,Y_o,Z_o$ of world coordinates $(X_o,Y_o,Z_o)$ can be in the upper right corner of surface 24.

Emitter 18 is preferably a coherent source, e.g., a laser diode or a Vertical Cavity Surface Emitting Laser (VCSEL), however, non-coherent sources including light emitting diodes (LEDs) can also be used. In the present embodiment emitter 18 is a VCSEL emitting probe radiation 20 at a frequency f and at an emission angle μ to centerline C.A. of object 10. Optics (see FIG. 4) are provided in the path of probe radiation 20 to form a scan beam 28. Scan mirror 16 mounted on scan arm 14 of length q (represented here by vector $R^q$) reflects scan beam 20 at an angle σ with respect to axis C.A. of object 10. In the present embodiment mirror 16 is in an undeflected or neutral position and its mirror axis M.A. is parallel to axis C.A. Hence, reflection angle σ at which probe radiation 20 is directed to surface 24 from mirror 16 in neutral position is equal to emission angle μ.

Scan beam 28 is directed along a path indicated by vector r and impinges on surface 24 of substrate 26 to form a scan point $P_o$ at $(x_o^s,y_o^s,0)$ in world plane $(X_o,Y_o)$ of world coordinates $(X_o,Y_o,Z_o)$. The origin of Euler rotated coordinates (X,Y,Z) at tip 12 of object 10 is on surface 24, i.e., also in world plane $(X_o,Y_o)$. Note that this world plane is co-planar with plane (X',Y') of non-rotated object coordinates (X',Y',Z'). The origin of object coordinates (non-rotated and rotated) is offset from the origin of world coordinates $(X_o,Y_o,Z_o)$ by displacement vector $D_o$ where the length of $D_o$, i.e., $|D_o|$ is:

$$|D_o|=\sqrt{(x_o^N)^2+(y_o^N)^2}. \quad (Eq. 1)$$

Also, scan point $P_o$ in world coordinates $(X_o,Y_o,Z_o)$ is offset from the origin of object coordinates by vector do that is at an angle β to axis X' in non-rotated plane (X',Y') or in world plane $(X_o,Y_o)$.

Figure 4:
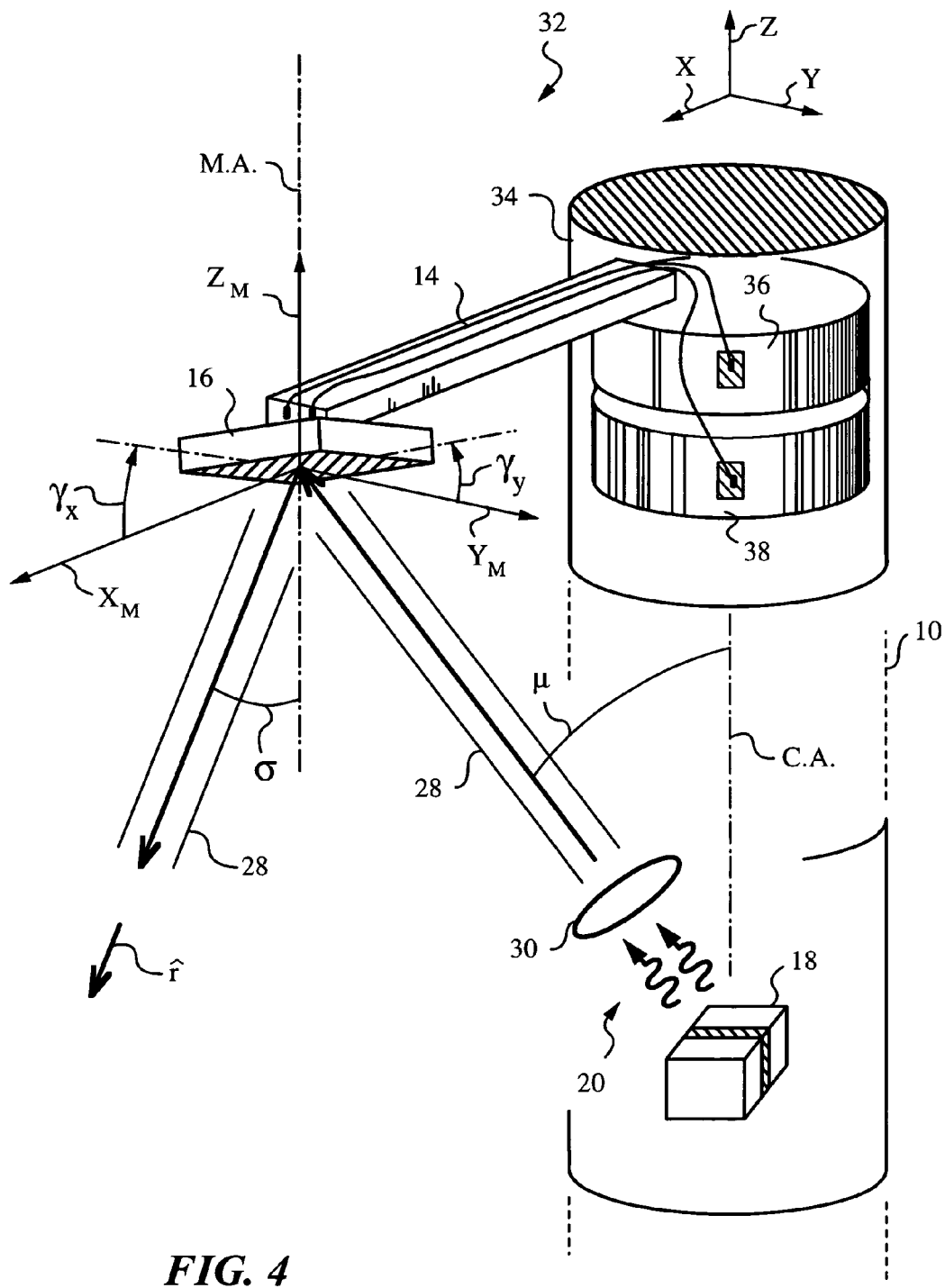
FIG. 4 is a partial view of the elongate object illustrating in detail a scanning arrangement with a biaxial scanner.

In the present embodiment scan arm 14, scan mirror 16, emitter 18 and optics 30 are part of a scanning arrangement 32, better illustrated in FIG. 4. Scanning arrangement 32 scans probe radiation 20 collimated in a scan beam 28 by optics 30 over surface 24 by varying angle σ. To accomplish this, scanning arrangement 32 has a biaxial scanner 34 consisting of an X-driver 36 and a Y-driver 38 for varying angle σ along two axes denoted here by $X_M$ and $Y_M$. Scan mirror 16 is a biaxial scan mirror and is preferably a MEMs mirror.

Alternatively, two uniaxial mirrors can be used instead of single biaxial scan mirror 16. Both, uniaxial and biaxial mirrors are known in the art. Although scanning axes $X_M$ and $Y_M$ are orthogonal in this embodiment, a skilled artisan will appreciate that this is not required.

X-driver 36 varies angle σ by controlling an x-deflection $γ_x$ of mirror 16 to axis $X_M$. Y-driver 38 varies angle σ by controlling a y-deflection $γ_y$ of mirror 16 to axis $Y_M$. For small deflections, the variation in angle σ can be expressed in terms of x- and y-components of angle σ, i.e., $σ_x$ and $σ_y$, and can thus be expressed as:

$$σ=(σ_x,σ_y)=(μ+2γ_x,2γ_y). \quad (Eq.\ 2)$$

It should be noted that x- and y-components of angle σ are defined with respect to the mirror axis M.A. indexed in neutral or undeflected position or equivalently with respect to axis C.A. of object 10 in Euler rotated object coordinates.

Referring back to FIG. 3, note that scan beam 28 or vector r intersects plane (X,Y) at point P* and continues to impinge on surface 24 at scan point $P_o$. To obtain the position of scan point $P_o$ in world coordinates on surface 24 several steps are required. First, we need a coordinate transformation from non-rotated object coordinates to plane (X,Y) in Euler rotated object coordinates. This transformation is defined in Euler angles by matrix R:

$$R = \begin{bmatrix} \cosψ\cosφ - \cosθ\sinφ\sinψ & \cosψ\sinφ + \cosθ\cosφ\sinψ & \sinθ\sinψ \\ -\sinψ\cosφ - \cosθ\sinφ\cosψ & -\sinψ\sinφ + \cosθ\cosφ\cosψ & \sinθ\cosψ \\ \sinθ\sinψ & -\sinθ\cosφ & \cosθ \end{bmatrix}.$$

The coordinates of a point (x',y',z') in non-rotated object coordinates (X',Y',Z') are transformed to point (x,y,z) in Euler rotated object coordinates (X,Y,Z) by applying matrix R as follows:

$$(x,y,z)=R(x',y',z'). \quad (Eq.\ 3A)$$

A reverse coordinate transformation from Euler rotated to non-rotated object coordinates is performed as follows:

$$(x',y',z')=R^T(x',y',z'), \quad (Eq.\ 3B)$$

where superscript T denotes the transpose of matrix R. Note that points (x,y,z) and (x',y',z') are treated as vectors in equations 3A and 3B.

The position of point P* in plane (X,Y) of Euler rotated object coordinates or P*(x,y) is determined by biaxial scanner 34 as a function of deflections $γ_x$, $γ_y$ as follows:

$$P^*(x,y)=(q+h \sin σ_x, h \sin σ_y)=(q+h \sin(μ+2γ_x), h \sin(2γ_y)) \quad (Eq.\ 4)$$

We observe that all points $P^s$ or along scan beam 28 or along vector r including point P* and scan point $P_o$ can be described in the Euler rotated object coordinates, i.e., $P^s$(x,y,z), P*(x,y) and $P_o$(x,y,z) by the following parametric equation:

$$P^s(x,y,z)=(q,0,h)+s[(x,y,0)-(q,0,h)]=(q+s(x-q),sy,h-sh), \quad (Eq.\ 5)$$

where s is a parameter. At scan point $P_o$ where scan beam 28 intersects world plane $(X_o,Y_o)$, namely at $(x_o^s,y_o^s,0)$, the value of parameter s is:

$$s = \frac{(q\sinθ\sinψ + ℓ\cosθ)}{(ℓ\cosθ - (x-q)\sinθ\sinψ - y\sinθ\cosψ)}. \quad (Eq.\ 6)$$

Substituting this value of s into equation 5 yields scan point $P_o$ in Euler rotated object coordinates. Now, using transpose matrix $R^T$ from equation 3B one obtains scan point $P_o$ in world coordinates $(X_o,Y_o,Z_o)$, i.e., $P_o(x_o^s,y_o^s,0)$:

$$P_o(x_o^s,y_o^s,0)=R^T(P^s(x,y,z))+D_o. \quad (Eq.\ 7)$$

Note that the value of $z_o^s$ of point $P_o$ in world coordinates has to be zero because scan point $P_o$ is in world plane $(X_o,Y_o)$. Thus, knowledge of $r_x$, $r_y$ allows determination of the coordinates of $P_o$ relative to tip 12.

The length of vector r represents the propagation distance of scan beam 28 from mirror 16 to scan point $P_o$ and is determined as follows:

$$r=|\vec{r}|=|(x-q,y,z-h)|. \quad (Eq.\ 8)$$

Figure 5:
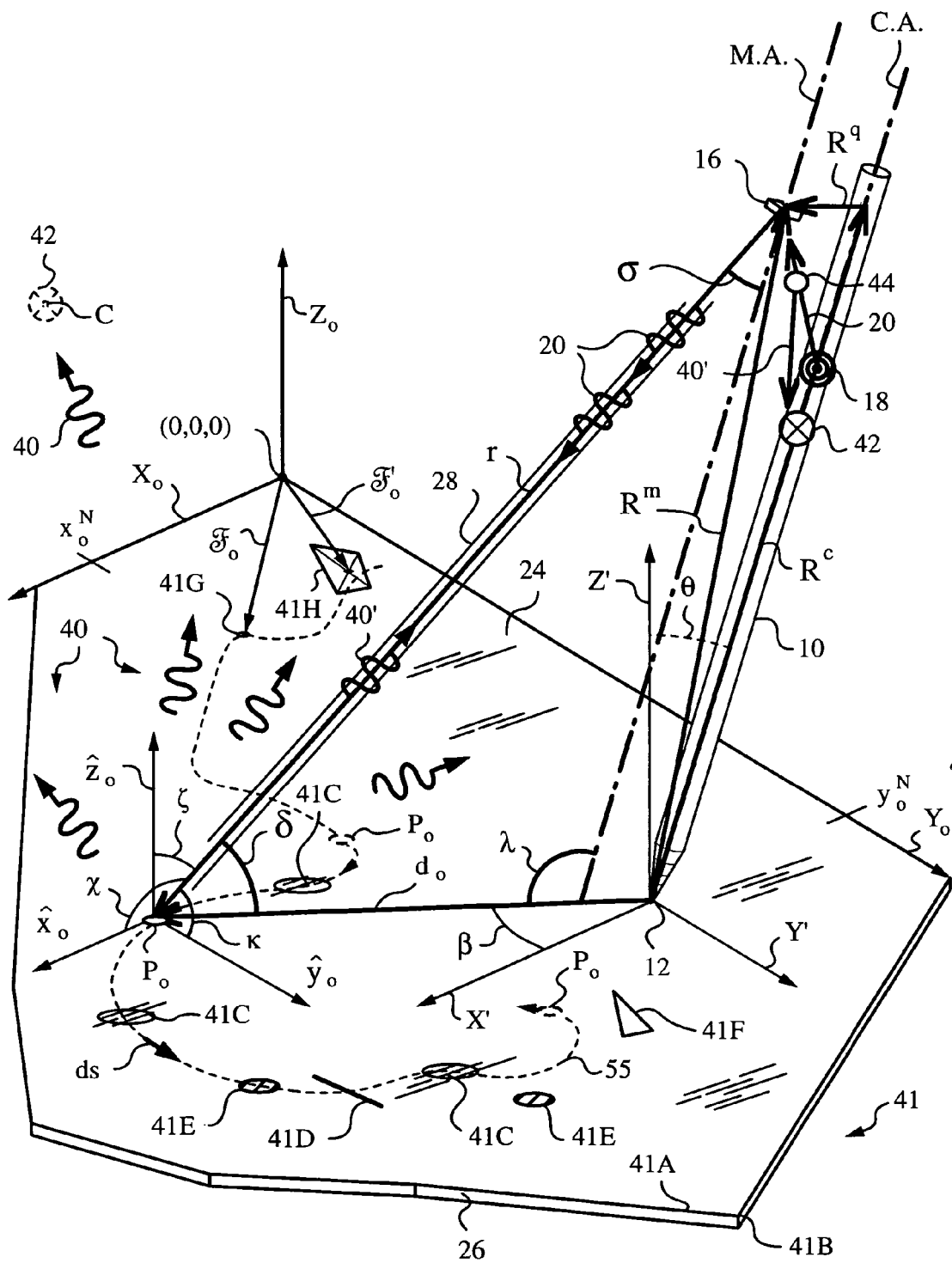
FIG. 5 is a diagram showing the movement of a scan point produced by a scan beam on a plane surface with a number of invariant features.

Knowledge of the length of vector r is used to determine an angle of incidence δ of scan beam 28 to surface 24, as shown in FIG. 5. Angle δ is the angle between vector $d_o$ from the origin of the object coordinates to scan point $P_o$ and vector r from mirror 16 to scan point $P_o$. Therefore, angle δ can be expressed as:

$$δ = \cos^{-1}\left\{\frac{(x,y,z)\cdot\vec{r}}{|(x,y,z)||\vec{r}|}\right\} \quad (Eq.\ 9)$$

$$= \cos^{-1}\left\{\frac{[x^2+y^2+z^2-(xq+zℓ)]}{\sqrt{x^2+y^2+z^2}\sqrt{(x-q)^2+y^2+(z-ℓ)^2}}\right\},$$

where (x,y,z) are the coordinates of scan point $P_o$ in Euler rotated object coordinates. The angle β of vector $d_o$ to non-rotated object axis X' is obtained from the dot product rule with axis X' or world axis $X_o$.

Probe radiation 20 illuminating plane surface 24 of substrate 26 scatters based on incident directions of probe radiation 20 to surface 24, frequency f of probe radiation 20 as well as physical characteristics of surface 24 and substrate 26. A bidirectional reflectance distribution function (BRDF) describes the spectral and spatial characteristics of a scattered portion 40 of probe radiation 20. The BRDF is a ratio of reflected radiance to incident flux density for all incident and reflected directions. The incident directions are fully described by direction cosines χ, κ and ζ, which can be obtained from the dot product of vector r with world unit vectors $\hat{x}_o,\hat{y}_o,\hat{z}_o$. Similarly, direction cosines (not shown) to unit vectors $\hat{x}_o,\hat{y}_o,\hat{z}_o$ describe the reflected directions of scattered portion 40.

Often surface 24 is Lambertian or almost Lambertian and the BRDF shows a continuous decrease from a maximum at ζ=0 (normal incidence). Whether surface 24 is or is not Lambertian, its BRDF should be measured at anticipated incident and reflected directions for calibration purposes. In the simplest cases third Euler angle ψ is close or equal to π/2 or 3π/2. In these cases BRDF is described directly in terms of angle of incidence δ with respect to surface 24 or angle δ'=(π/2)−δ with respect to surface normal $\hat{z}_o$ without having to compute direction cosines. For other values of Euler angle ψ the direction cosines have to be used for a full description of the incident directions.

The response of scattered portion 40 of probe radiation 20 to surface 24 can thus be described by a change in the intensity of scattered portion 40 as a function of reflected directions. In addition, surface 24 has one or more invariant features, indicated by general reference 41. Features 41 also produce a response in scattered portion 40, such as a further change in the intensity of scattered portion 40. In general, the response of scattered portion 40 to surface 24 and to features 41 can include not only a change in intensity but also a polarization-based response. FIG. 5 illustrates a few examples of invariant features 41 including an edge 41A and a corner 41B of plane surface 24. In fact, any feature belonging to, attached to or located on surface 24 such that it remains fixed in world coordinates $(X_o, Y_o, Z_o)$ can be used as an invariant feature if it produces a detectable response in scattered portion 40 of probe radiation 20. Thus, both micro-structure and macro-structure belonging to or deposited on surface 24 qualify as invariant features 41. In the embodiment shown, additional invariant features belonging to surface 24 are designated as follows: micro-structures 41C, a surface marking 41D, roughened surface portions 41E, an attached object 41F, a point-like feature 41G and a scribed feature 41H of known geometry. Retroreflective invariant features can also be used.

According to the invention, the response of scattered portion 40 of probe radiation 20 to surface 24 and to invariant features 41 thereon is used to derive the pose of object 10 and the absolute position of tip 12 on surface 24. Any invariant feature 41 yielding a detectable reaction to probe radiation 20 and whose position in world coordinates is fixed can be used. It is most convenient to measure scattered portion 40 returning to elongate object 10 at a certain angle τ. In general, angle τ can be different from angle σ. In the present embodiment τ=σ such that the detected part of scattered portion 40 is in fact a back-scattered portion 40'.

The derivation of the absolute position of tip 12 is equivalent to finding the origin of Euler rotated object coordinates (X,Y,Z) (coincident with the origin of non-rotated object coordinates (X',Y',Z')) in world coordinates $(X_o, Y_o, Z_o)$; i.e., it is equivalent to finding vector $D_o$ (see FIG. 3). Thus, for the purposes of this application, absolute position is defined relative to the origin of world coordinates that are fixed or invariant for the purposes of the invention. As remarked above, to find the absolute position of tip 12 it is necessary to determine the pose of elongate object 10. The pose includes the position of tip 12 as well as the orientation of elongate object 10 in three dimensional space. Although many conventions and coordinate systems are available for describing the orientation of elongate object 10, in this application the orientation is described by Euler angles $(\phi, \theta, \psi)$. This is particularly convenient, since the inclination of elongate object 10 to plane surface 24 described by inclination angle θ between an axis of object 10, in this case axis C.A. and a normal to surface 24, i.e., axis Z', and second Euler angle θ are equivalent.

There are a number of ways for finding the absolute position of tip 12 based on invariant features 41. In one case, the origin of world coordinates is known a priori or can be ascertained at any time because it is uniquely marked (e.g., by an invariant feature). The invariant feature that is located is a point-like feature 41G with an a priori known vector $\Im_o$ from the origin of the world coordinates. Specifically, feature 41G is located based on an intensity variation corresponding to scan point $P_o$ of scan beam 28 traversing feature 41G. In other words, scattered portion 40 exhibits a response to surface 24 and feature 41G by an intensity variation. This intensity variation in scattered portion 40 can be measured at any chosen point in space by a detector 42. In the present embodiment, detector 42 and an optic 44, e.g., a beam-splitter, are provided on object 10 to direct back-scattered portion 40' of probe radiation 20 returning at angle σ to detector 42 for detecting the intensity variation.

When feature 41G causes an intensity variation in back-scattered portion 40' detected by detector 42 angle σ is known from scanning arrangement 32. Also known are vectors $R^c$, $R^q$ and $\Im_o$. The location of the world origin or the tail of vector $\Im_o$ is easiest to describe by a reference angle $\sigma_o$ that scan mirror 16 would need to assume to direct probe radiation 20 to the world origin. In practice, the location of the world origin or reference angle $\sigma_o$ can be tracked by periodically directing scan mirror 16 to the invariant feature marking the world origin. Thus, finding vector $D_o$ reduces to triangulation that also yields vector r and the Euler angles describing the orientation of object 10. In some cases, the requirement of information of angular position or angle σ of the scan mirror can be relaxed when auxiliary information such as distance of scan mirror 16 to the invariant feature is known or measured. For example, the landmark can have a predetermined pattern which when scanned with a beam will result in a temporal signal that contains information about distance when the angular velocity of the mirror is known, i.e., a bar code pattern.

It should be noted that the movement of object 10 has to be slow in comparison to the scan rate of angle σ and the triangulation procedure in order to determine the absolute position of tip 12 in real time. At the very least, the movement of object 10 has to be slow in comparison to the scan rate to determine the absolute position of tip 12 at some later point in time. A person skilled in the art will recognize that any number of triangulation procedures can be used and many variations of this case can be implemented to find vector $D_o$.

Another way of finding the absolute position of tip 12 takes advantage of invariant feature 41H of known geometry. In this case, a vector $\Im_o'$ to feature 41H and its orientation on surface 24 are known. The location of the world origin does not need to be tracked in this case. Feature 41H causes a number of intensity variations in back-scattered portion 40' corresponding to its geometry. Specifically, the edges of feature 41H cause intensity variations at times when scan point $P_o$ moves over them. The values of angle σ at those times are obtained from scanning arrangement 32. In fact, scanning arrangement 32 varies angle σ such that point $P_o$ crosses at least three edges of feature 41H, and preferably all four edges multiple times before the position of object 10 changes appreciably. From the values of angle σ at these crossing times the geometry of feature 41H from the viewpoint of scan mirror 16 is reconstructed. The pose of object 10 and absolute position of tip 12 are derived by comparing the reconstructed geometry with the known geometry of feature 41H. Once again, a person skilled in the art will recognize that a number of geometrical techniques including triangulation and finding of the vanishing points of the edges of feature 41H can be used in this derivation.

Other ways of finding the absolute position of tip 12 can take advantage of other invariant features 41 that have more or less information than feature 41H and as little information as feature 41G. Features 41 can be used in any combination and any number of geometrical techniques can be employed in their processing. Also, additional knowledge such as inclination angle θ or second Euler angle and third Euler angle ψ can be employed in deriving absolute position of tip 12. Angles θ and ψ can be obtained from an inclinometer (not shown) or any other apparatus and/or method.

Figure 6:
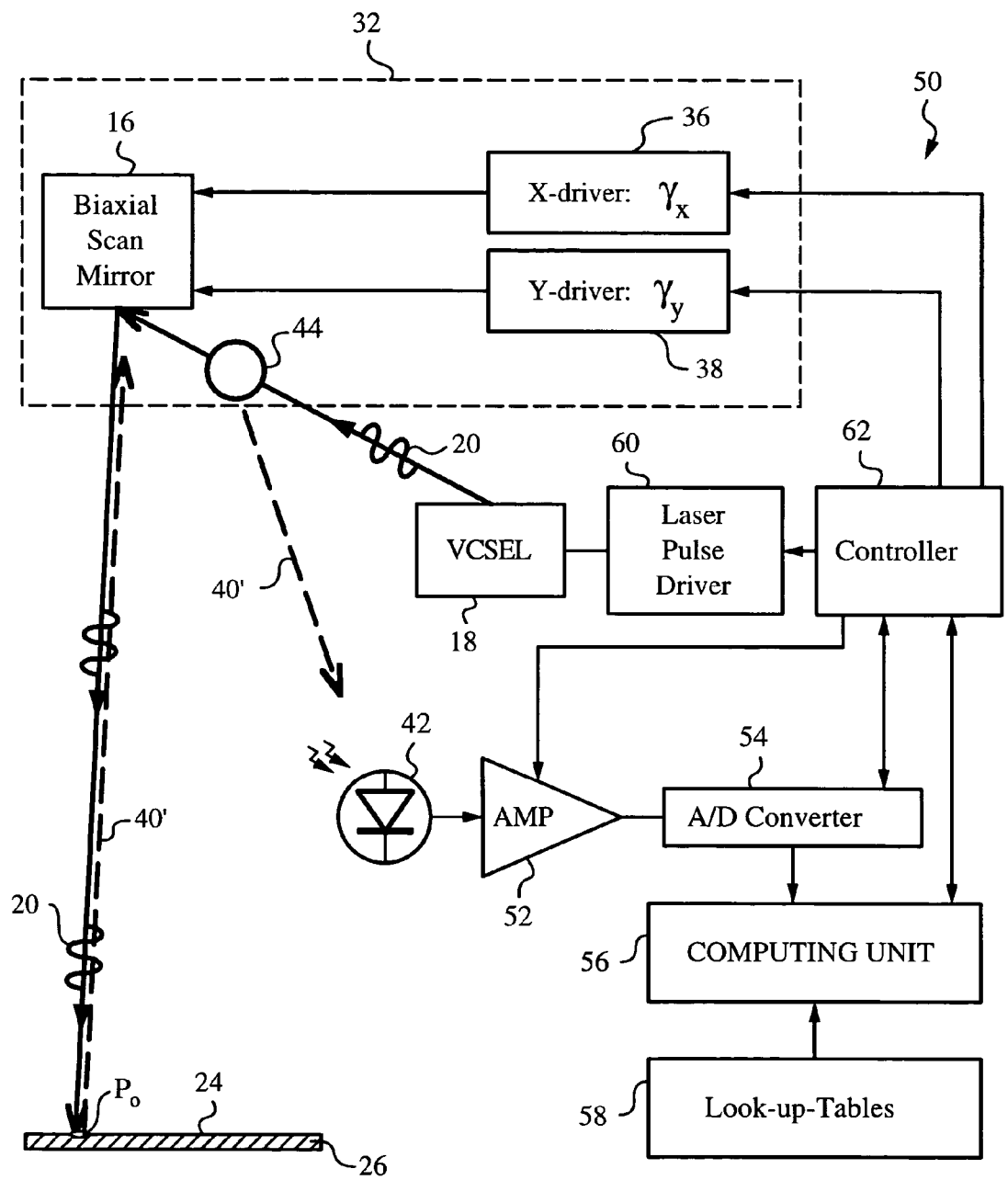
FIG. 6 is a functional schematic illustrating the process of deriving the absolute position of the tip from changes in intensity in back-scattered portion of probe radiation.

FIG. 6 shows an exemplary control circuit 50 for operating scanning arrangement 32 and deriving absolute position of tip 12. A person skilled in the art will appreciate that various control circuits can be used and that their design depends, among other, on the type of detector 42 and scanning arrangement 32.

Circuit 50 is connected to scanning arrangement 32 and to detector 42. Circuit 50 has an amplifier 52 connected to detector 42 and an analog-to-digital converter ADC 54 connected to amplifier 52. Amplifier 52 amplifies signals from detector 42 and it can be a transimpedance amplifier, an operational amplifier or any other suitable amplifier. ADC 54 is matched for digitizing the amplified signal from amplifier 52. Circuit 50 also has a computing unit 56 connected to ADC 54 for receiving digital signals corresponding to signals generated by detector 42. Computing unit 56 communicates with a module 58 containing look-up tables and data such as the values of vectors $R^c$, $R^q$, $\Im_o$, $\Im_o'$ and other data required by computing unit 56 for obtaining the absolute position of tip 12. Preferably, module 58 is a rapid access memory. A laser pulse driver 60 of circuit 50 is connected to VCSEL 18 for controlling the generation of probe radiation 20.

A controller 62 orchestrates the operation of circuit 50 and synchronizes it with scanning arrangement 32 and detector 42. For this purpose, controller 62 is connected to X- and Y-drivers 36, 38, laser pulse driver 60, amplifier 52, ADC 54 and computing unit 56.

During operation, elongate object 10 executes motions while tip 12 is on surface 24. In the preferred embodiment, the absolute position of tip 12 is derived over time periods that are very short in comparison to the times during which object 10 moves by any appreciable amount. Controller 62 ensures that the operation is sufficiently rapid by adjusting the rate of operation of VCSEL 18 and scanning arrangement 32.

Specifically, controller 62 instructs laser pulse driver 62 to drive VCSEL 18 at a certain pulse rate or even continuously. Also, controller 62 operates X- and Y-drivers 36, 38 of scanning arrangement 32 such that angle σ varies sufficiently rapidly. Now, angle σ varies because X- and Y-drivers 36, 38 are instructed by controller 62 to change x- and y-deflections $\gamma_x$, $\gamma_y$. Consequently, scan beam 28 of probe radiation 20 passes over surface 24 and produces back-scattered portion 40' of probe radiation 20 returning from locations scanned by scan point $P_o$ on surface 24 (see FIG. 5). When object 10 is a human-operated implement such as a cane, a pointer, a robotic arm or a jotting implement such as a pen, pencil or stylus, then angle σ preferably varies faster than human movement.

The successive locations of scan point $P_o$ form a discontinuous or continuous scan line or scan pattern 55 (see FIG. 5) depending on the pulsing of VCSEL 18. The shape of scan pattern 55 is created by controller 62 instructing X-driver and Y-driver to vary x- and y-deflections $\gamma_x$, $\gamma_y$, thus varying angle σ in any convenient pattern.

During the continuous scan detector 42 generates a signal corresponding to the intensity of back-scattered portion 40' of probe radiation 20. Amplifier 52 amplifies this signal to a gain level sufficient for conversion to a digital signal by ADC 54. Controller 62 supervises this process and adjusts gain of amplifier 52 as necessary.

The amplified signal is delivered to computing unit 56. During the continuous scan of angle σ computing unit 56 obtains a graph of the intensity of back-scattered portion 40' and notes intensity variations corresponding to the reaction of surface 24 and invariant features 41. Preferably, a nominal intensity of scan beam 28 when no invariant features are present is provided by controller 62, which knows the power level of VCSEL 18 producing probe radiation 20. Alternatively, a scan beam power monitor (not shown) can provide the nominal intensity to computing unit 56.

In deriving the pose of object 10 and obtaining the absolute position of tip 12 computing unit 56 notes the intensity variations corresponding to features 41 and uses the appropriate mathematical procedure, e.g., triangulation as described above to derive the absolute position of tip 12. In performing these functions, unit 56 also uses data from module 58 and values of angle σ from scanning arrangement 32. For rapid comparison, that data is stored in the form of look-up tables. The look-up tables in module 58 can contain responses of features 41 for all possible combinations of Euler angles or poses of object 10 and angle σ. Alternatively, the look-up tables can be obtained during calibration at some select values of third Euler angle ψ and inclination angle θ for a continuous scan of angle σ.

Figure 7:
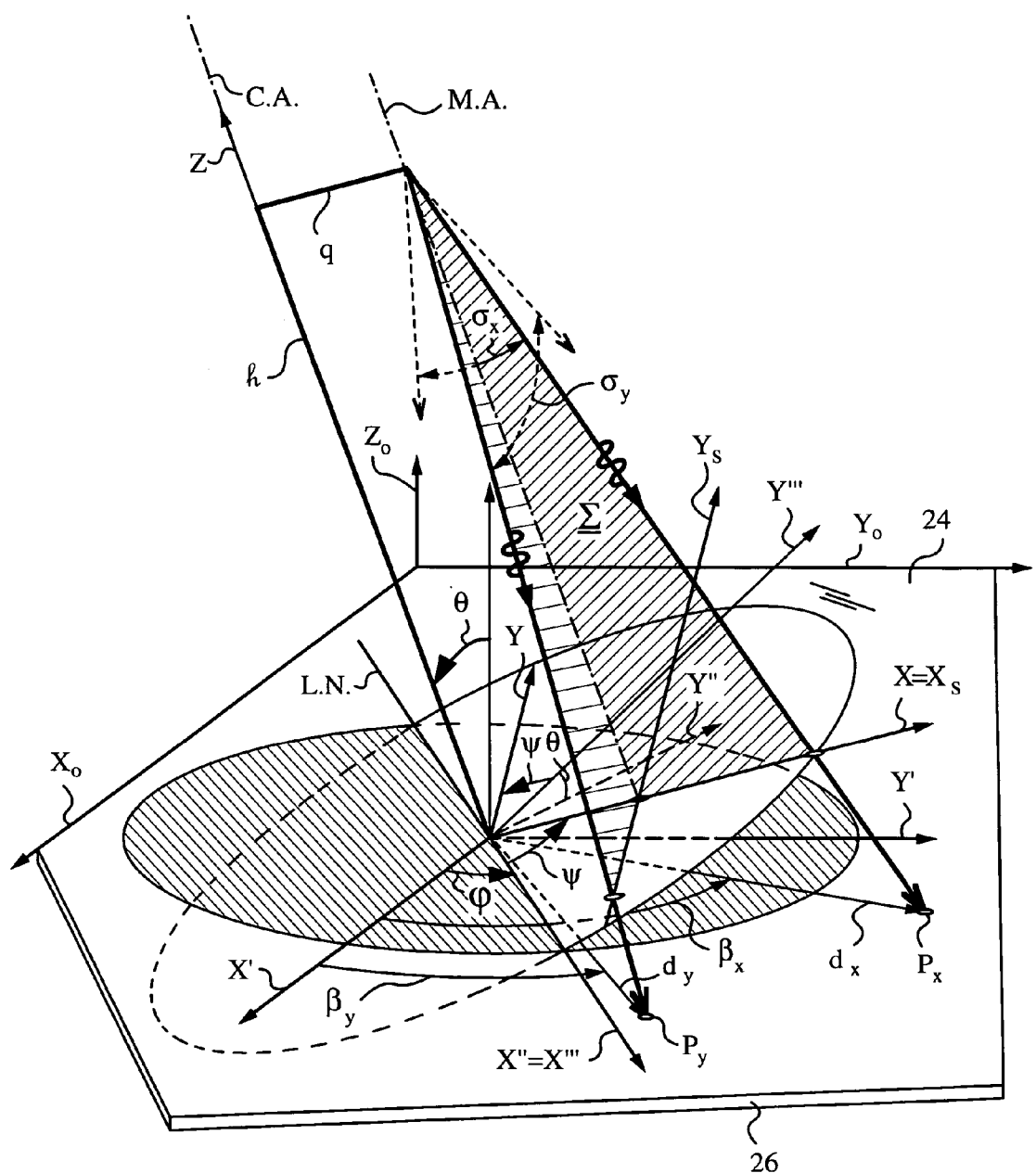
FIG. 7 is a diagram illustrating in more detail how various scan patterns can be produced by the biaxial scanner of FIG. 4.

In practice, it is preferable to use a known and well-behaved scan pattern 55 for illuminating surface 24 in search of invariant features 41. One can use scan patterns that can be described in parametric form by x- and y-components $\sigma_x$, $\sigma_y$ of angle σ under small angle approximation. FIG. 7 illustrates how independent variation of x- and y-components $\sigma_x$, $\sigma_y$ over their angular ranges affects the location of corresponding scan points $P_x$ and $P_y$ on plane 24. The $X_s$ and $Y_s$ axes are drawn in the plane (X-Y) in rotated object coordinates. Describing the scan patterns with the aid of $X_s$ and $Y_s$ axes is convenient since in the plane (X-Y) the scan patterns are not distorted, as they will be on surface 24 when inclination angle θ is non-zero.

In a preferred embodiment, biaxial scanner 32 uses X- and Y-drivers 36, 38 to vary x- and y-deflections $\gamma_x$, $\gamma_y$ in a periodic fashion as follows:

$$(\gamma_x, \gamma_y) = (A \sin\omega_x t, B \sin(\omega_y t + \Delta)). \quad \text{(Eq. 10)}$$

In this equation Δ is the phase difference between x-deflection $\gamma_x$ and y-deflection $\gamma_y$ and A and B are deflection amplitudes in degrees. The instantaneous value of σ is obtained from Equation 2 as follows:

$$\sigma(t) = (\sigma_x, \sigma_y) = (\mu + 2A \sin\omega_x t, 2B \sin(\omega_y t + \Delta)). \quad \text{(Eq. 11)}$$

Figure 8A:
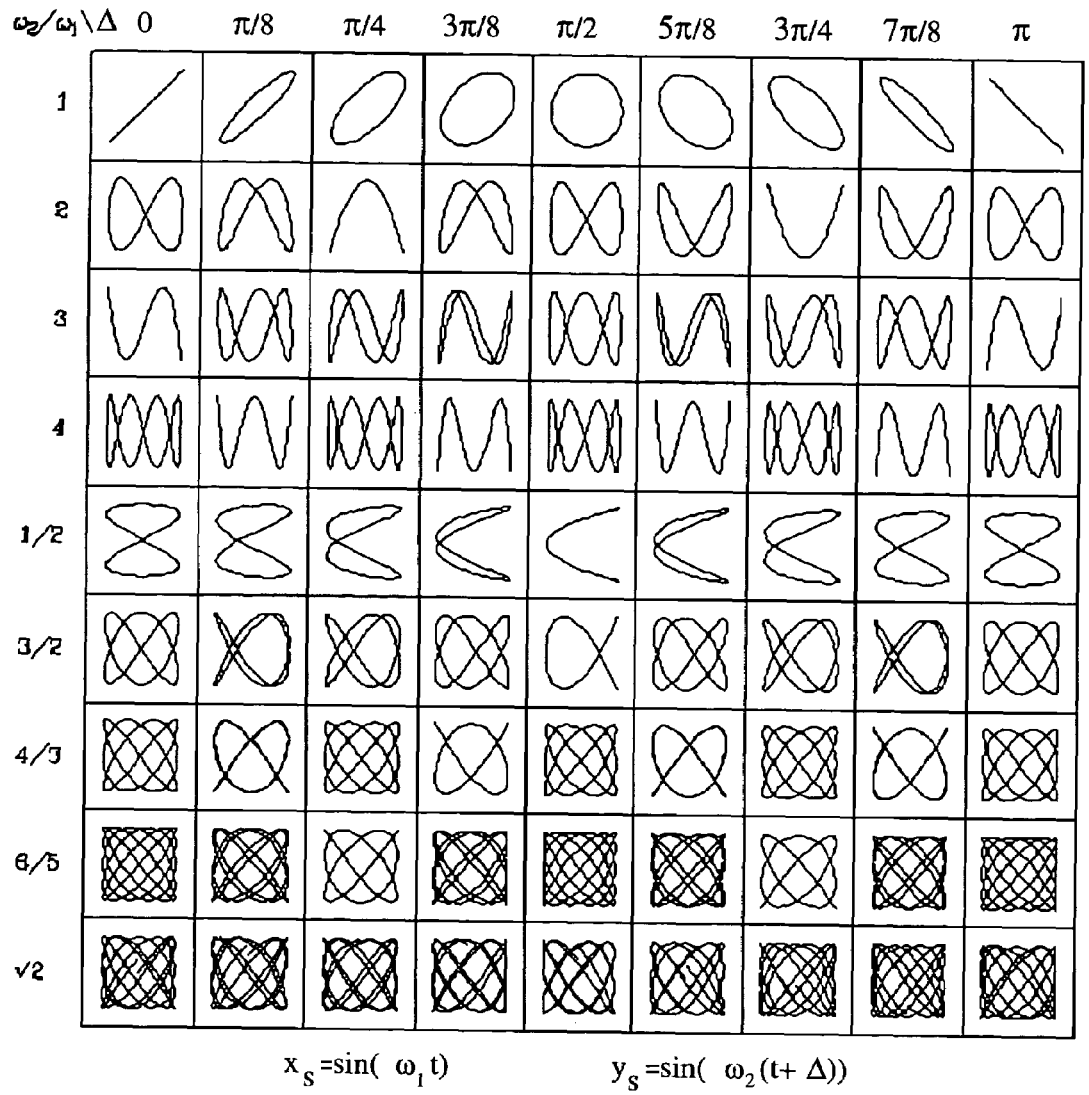
FIG. 8A shows a set of biaxial scan patterns known as Lissajous figures.

A person skilled in the art will recognize that Equation 11 represents a general parametric formulation of scan patterns known as Lissajous figures. Some of the Lissajous figures that can be used as scan patterns are shown in FIG. 8A. Since these figures are sinusoidal and well-behaved they are suited for use as scan pattern 55.

It should be noted that any number of continuous and discontinuous scan patterns including combinations of radial and/or polar patterns and raster scan patterns can be used as well. It should also be noted that a scan pattern can be described in terms of paths traced out by scan point $P_o$ in terms of vector $d_o$ and angle β in world coordinates ($X_o, Y_o, Z_o$). Look-up tables of scan patterns in terms of $d_o$, β and associating them with the values of ψ and θ while tip 12 is in contact with surface 24 can be obtained during calibration and stored in the look-up tables in module 58.

In a particular embodiment scan pattern 55 is the Lissajous figure with a ratio $\omega_x/\omega_y = 4/3$, phase difference Δ=0 and deflection amplitudes A and B equal and normalized to 1. This Lissajous figure is described by:

$$\vec{x}(t) = (\sin 4t, \sin 3t), \quad \text{(Eq. 12A)}$$

and the instantaneous velocity of scan point $P_o$ along the Lissajous figure is obtained by taking the time derivative:

$$\vec{v}(t) = \frac{d\vec{x}}{dt} = (4\cos 4t, 3\cos 3t).$$ (Eq. 13A)

Figure 8B:
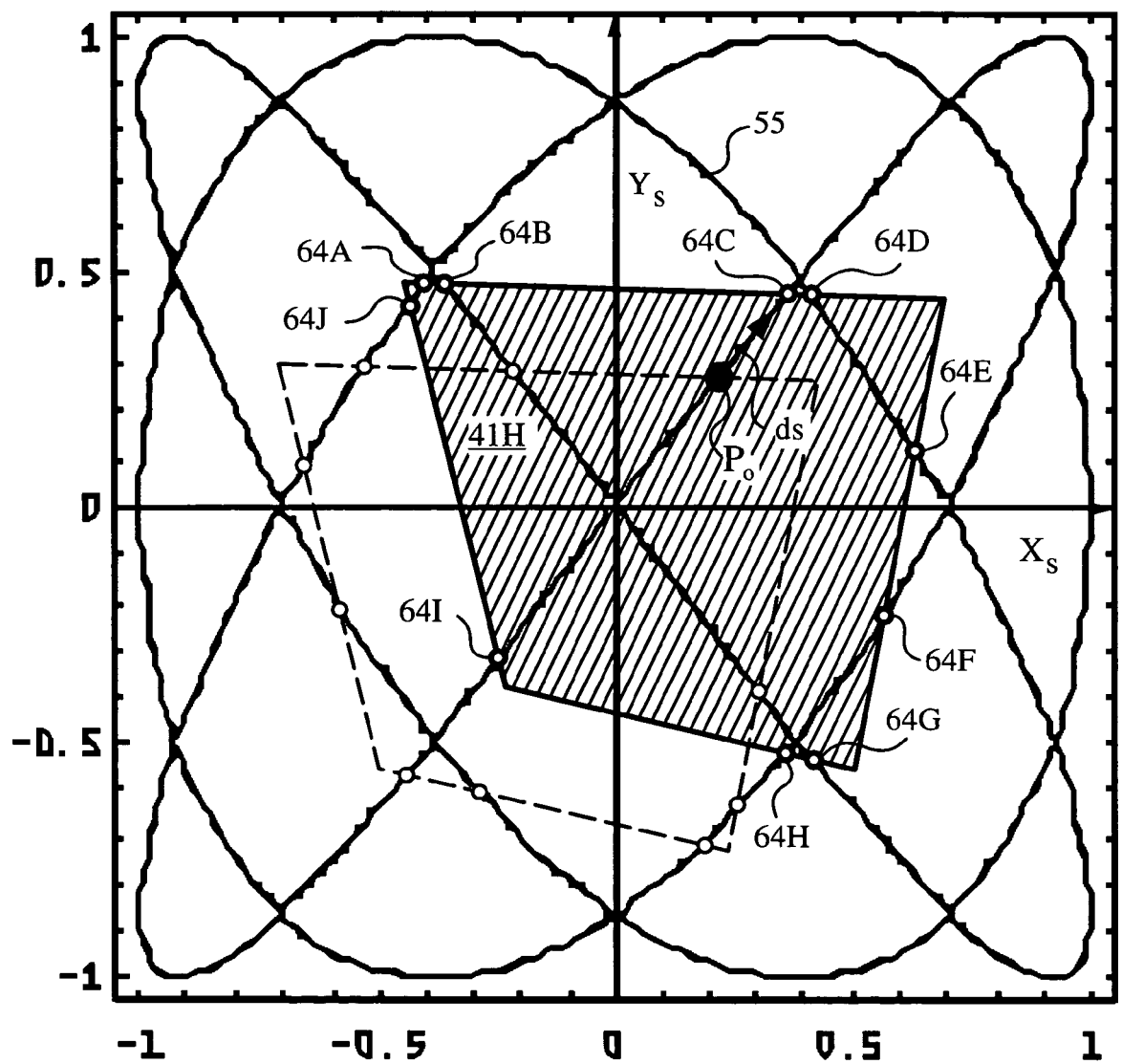
FIG. 8B shows the application of a particular Lissajous figure from among the patterns in FIG. 7A as the scan pattern for scanning an invariant feature.

The shape of scan pattern 55 in the plane (X-Y) parameterized on the $X_s$ and $Y_s$ axes (see FIG. 7) is shown in FIG. 8B. Although scan pattern 55 is distorted on surface 24 as a function of inclination angle θ and third Euler angle ψ, let us first examine it in the plane (X-Y) or assuming that θ=0. Under this condition, scan pattern 55 projected on invariant feature 41H of known geometry, more precisely a quadrilateral, produces intensity variations in back-scattered portion 40' at ten points 64A, 64B, . . . , 64J. These intensity variations mark the ten times during one cycle of Lissajous FIG. 55 when scan point $P_o$ traverses an edge of quadrilateral 41H. One should note that if the interior surface (shaded portion) of feature 41H differs from surface 24, then this interior surface will in general produce a different response in scattered portion 40' of probe radiation 20 than surface 24.

In order to determine the location of points 64A, 64B, . . . , 64J in plane 24, computing unit 56 tracks the instantaneous position of scan point $P_o$ and its velocity. Using the $X_s$ and $Y_s$ axes and equation 12A the position of scan point $P_o$ is described in parametric form by:

$$(x_s, y_s) = (q + h\sin(\mu + 2A\sin\omega_x t), h\sin(2A\sin\omega_y t)).$$ (Eq. 12B)

Differentiation of equation 12B yields the instantaneous velocity of scan point $P_o$ in parametric form:

$$\vec{v}_s(t) = (2Ah\omega_x \cos\omega_x t \cos(\mu + 2A\sin\omega_x t), 2Ah\omega_y \cos\omega_y t \cos(2A\sin\omega_y t)).$$ (Eq. 13B)

During each cycle of Lissajous FIG. 55, unit 56 registers intensity variations at crossing times $t_1, t_2, \ldots, t_{10}$ corresponding to crossings of edges at points 64A, 64B, 64J by scan point $P_o$. Since the velocity of scan point $P_o$ in tracing out Lissajous FIG. 55 varies as a function of position, unit 56 equalizes the intensity of back-scattered portion 40' registered by detector 42 at those points with the aid of equation 13. This ensures that an equalized amount of intensity is considered from each path segment ds.

Variation in equalized intensity of back-scattered portion 40' can be used directly by unit 56 to indicate edges of feature 41H. That is because the relative change in equalized intensity of back-scattered portion 40' as scan beam 28 crosses an edge is typically large. In fact, in many cases the change is large enough to be detected without any equalization at all. In case the change is not as large, unit 56 can apply additional normalization to the equalized intensity of back-scattered portion 40' to account for angle of incidence δ of scan beam 28 to plane 24 using equation 9 and distance |r| from plane 24 to scan mirror 16 using equation 8. Unit 56 can use the BRDF in this normalization.

It should be noted that a movement of Lissajous FIG. 55 with respect to feature 41H as indicated in dashed lines causes a relocation of points at which scan beam 28 crosses the edges of feature 41H. Consequently, crossing times $t_1, t_2, \ldots, t_{10}$ at which the intensity variations are registered by detector 42 change as well. In fact, the number of edge crossings or points can change too. Preferably, unit 56 tracks the crossing times as a function of when they happen during each cycle of Lissajous FIG. 55, i.e., as a function of phase. In one particular embodiment, unit 56 instructs controller 56 to continuously adjust the parameters of Lissajous FIG. 55 and/or where it is projected by scan mirror 16 to keep Lissajous FIG. 55 centered or locked on feature 41H. Such locking eliminates seek times during which back-scattered portion 40' of probe radiation 28 projected onto surface 24 in Lissajous FIG. 55 is analyzed by unit 56 to determine whether an invariant feature has been found.

In general, angle θ will not be equal to zero, as assumed in the above case. In deriving the absolute position of tip 12 when angle θ is not equal to zero unit 56 accounts for the distortion of Lissajous FIG. 55 due to Euler angles θ and ψ. As mentioned above, unit 56 can use an inclinometer or other suitable device and/or method to obtain the value of θ and ψ. Also, the most recent prior values of θ and ψ can be used for a cross check. Once these values are obtained, unit 56 uses equations 7 and 12 to derive the position of scan point $P_o$ in world coordinates at time t, or $P_o(x_o, y_o, t)$, on surface 24 as follows:

$$P_o(x_o, y_o, t) = R^T(q + h\sin(\mu + 2A\sin\omega_x t), h\sin(2A\sin\omega_y t)) + D_o.$$ (Eq. 14)

Since equation 14 describes Lissajous FIG. 55 on surface 24 in world coordinates and these are the coordinates of feature 41H, no further transformation is necessary in registering crossing times corresponding to the edges of feature 41H. Back-scattered portion 40' is equalized and normalized when necessary, as discussed above, by using equation 14 and the velocity of point $P_o$ on surface 24 obtained by differentiating equation 14 with respect to time.

Figure 9:
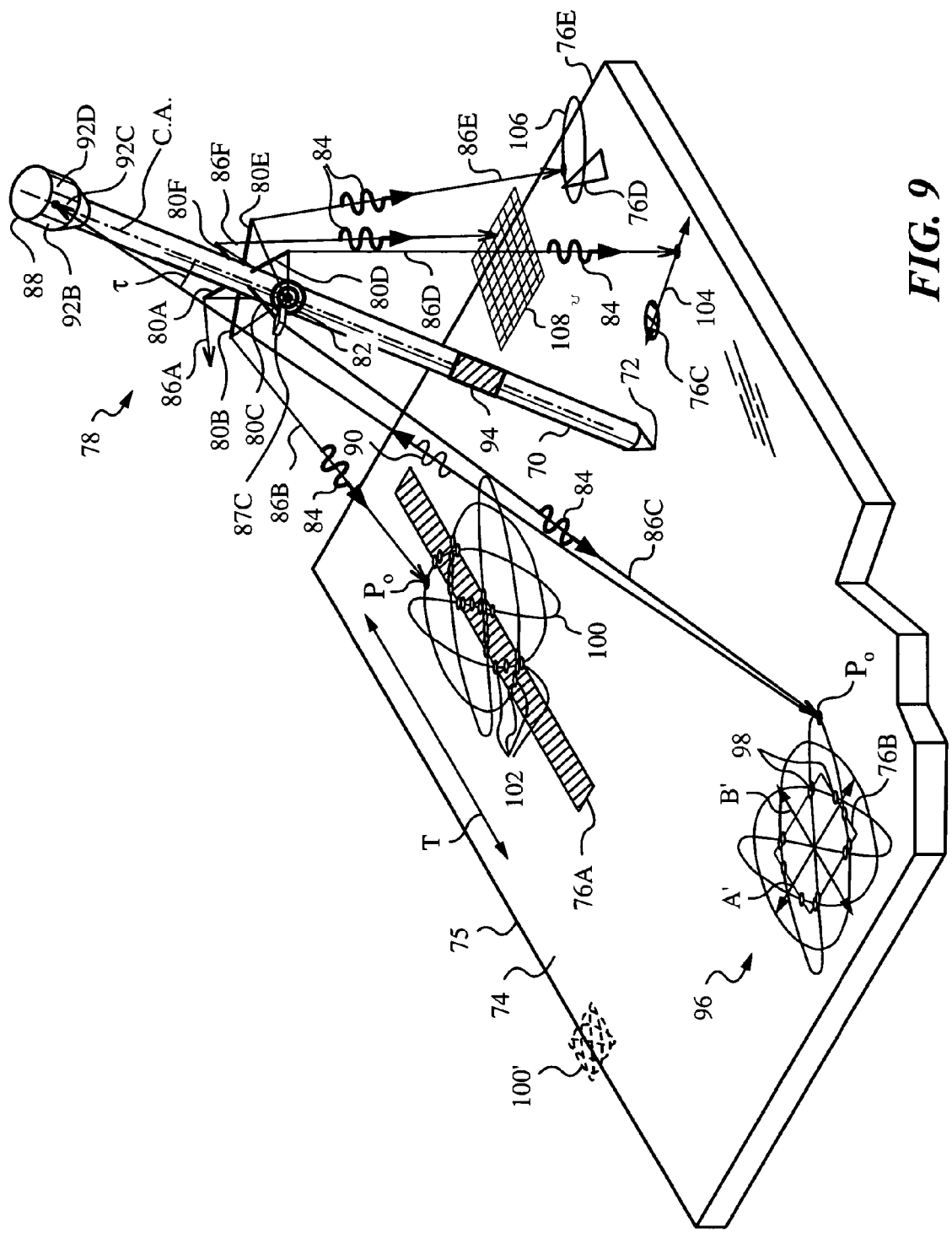
FIG. 9 is a three-dimensional view of an elongate object having a number of scan arms equipped with scan mirrors for projecting Lissajous figures and radial scan patterns.

FIG. 9 illustrates an elongate object 70 having a tip 72 contacting a plane surface 74. Surface 74 has invariant features 76A, 76B, 76C and 76D. Object 70 has a scanning arrangement 78 with a biaxial scanner having a number of scan arms 80A, 80B, 80C, 80D, 80E and 80F and a common emitter 82 for generating a probe radiation 84 for illuminating plane surface 74. The six scan arms 80A, 80B, . . . , 80F have appropriate optics including collimating elements and biaxial scan mirrors for shaping probe radiation 82 into a corresponding number of scan beams 86A, 86B, . . . , 86F and directing them at surface 74. Only biaxial scan mirror 87C on scan arm 80C is illustrated for clarity.

A detector 88 is mounted on object 70 above scanning arrangement 78. Detector 88 detects a scattered portion 90 of probe radiation 84 returning to object 70 at an angle τ. Just like angle σ (see, e.g., FIG. 5) angle τ is measured with respect to an axis of object 70, in this case central axis C.A. Detector 88 has detection sub-units 92A through 92F for detecting scattered portion 90 of probe radiation 84 from corresponding scan beams 86A through 86F. Only detection sub-units 92B, 92C and 92D are visible in FIG. 9. Detection sub-units 92A through 92F may each have their own optics or share common optics for admitting and guiding scattered portion 90.

Detector 88 is offset with respect to emitter 82 and is positioned to look at scattered portion 90 from a different point of view than any of the scan mirrors. Thus, in contrast with the previous embodiment in which back-scattered portion of probe radiation was detected, detector 88 receives scattered portion 90 scattered by surface 74 at an angle that is not equal to the angle of incidence δ. Consequently, angles σ and τ are different.

Object 70 has a computing unit 94 and associated circuitry (not shown) for communicating with detector 88 and scanning arrangement 78. Computing unit 94 is advised of the operational status of scanning arrangement 78 such as the timing of scan patterns employed by each arm 80A, . . . , 80F, and duty cycle of probe radiation 84. Computing unit 94 also receives data from detector 88 such as signals produced by scattered portion 90 of probe radiation 84 at detector sub-units 92A, . . . , 92F. Computing unit 94 uses information from scanning arrangement 78 and detector 88 to determine the absolute position of tip 72 on surface 74 from the response of surface 74 and invariant features 76A, ..., 76D to probe radiation 84.

To understand the operation of this embodiment, consider scan arm 80C illuminating surface 74 and invariant feature 76B with probe radiation 84 collimated in scan beam 86C and directed to surface 74 at angle σ to axis C.A. Biaxial scan mirror 87C is driven by the biaxial scanner to vary x- and y-components $\sigma_x$, $\sigma_y$ of angle σ such that scan beam 86C follows a scan pattern 94. Scan pattern 94 is a biaxial scan pattern and more precisely a Lissajous figure with an angular velocity ratio $\omega_x/\omega_y=4/3$, phase difference $\Delta=0$ and deflection amplitudes equal to A and B.

Object 70 is in a pose where second and third Euler angles θ, ψ are not zero. Thus, scan point $P_o$ produced on surface 74 by scan beam 86C traces out Lissajous FIG. 96 that is distorted in world coordinates. The overall distortion of Lissajous FIG. 96 can be characterized by the change of amplitudes A and B from their value at θ=0 to values A' and B' at the given θ and ψ. Detector 88 and in particular detection sub-unit 92C detects scattered portion 90 of probe radiation 84 in scan beam 86C from a different point of view than mirror 87C. Therefore, from the point of view of detection sub-unit 92C Lissajous FIG. 96 appears distorted in accordance with the principles of stereo vision. This distortion is corrected by computing unit 94 from knowledge of angles θ, ψ, which can be acquired from an inclinometer.

In determining the absolute position of tip 72 on surface 74, computing unit 94 preferably equalizes and normalizes the intensity of scattered portion 90 to account for varying velocity of scan point $P_o$ and for angles θ and ψ. In addition, Lissajous FIG. 96 can be projected in a lock-mode, such that once it finds invariant feature 76C, it remains locked on it. In other words, the crossing times marked by points 98 where scan point $P_o$ crosses an edge of invariant feature 76C retain the same phase relationship during each cycle of Lissajous FIG. 96. Such locking can be accomplished, for example, with the aid of phase-control circuits including phase-lock-loops (PLLs). The actual derivation of position of tip 72 is performed in accordance with the above-mentioned geometrical principles.

Alternatively, scanning arrangement 78 uses scan beam 86B to project a Lissajous FIG. 100 that moves along or tracks invariant feature 76A as indicated by arrow T. In this the crossing times marked by points 102 will typically not retain the same phase relationship. Tracking can be employed, e.g., when the invariant feature is large e.g., long such as an edge 75 of surface 74 and is tracked by a Lissajous FIG. 100' indicated in a dashed line. Alternatively, tracking can be used when the invariant feature represents or contains other information useful in position recovery including special markings, as is the case with feature 76A where the markings are indicated by hatching.

It should be noted that not all scan beams need to employ the same scan patterns. Scan beam 86D, for example, follows a radial scan pattern 104. Scan beam 86E follows a circular scan pattern 106. Scan beam 86F follows a raster scan pattern 108. It is also important to ensure that scattered portion 90 produced by a particular scan beam, e.g., scan beam 86C does not affect detection of sub-units assigned to receive scattered portion 90 produced by other scan beams. In other words, detection sub-unit 92B intended to receive scattered portion 90 from scan beam 86B should not be affected by scattered portion 90 from scan beam 86C. This can be done, for example, by adjusting the on and off times or multiplexing scan beams 86A, ..., 86F or else by operating them at different frequencies.

Figure 10:
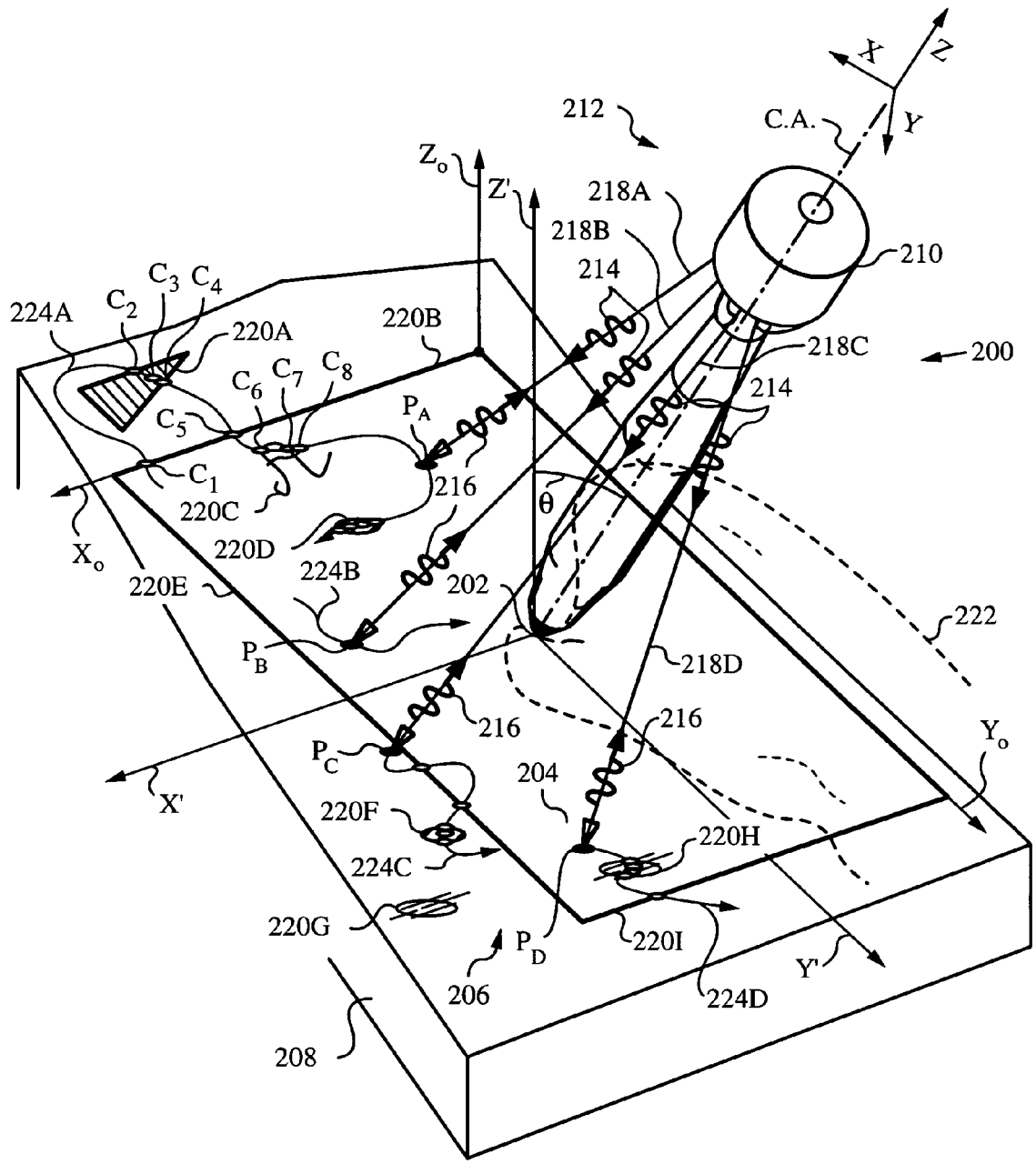
FIG. 10 is a three-dimensional view of a preferred embodiment of the invention in which the elongate object is a jotting implement.

A preferred implementation of the apparatus of invention is found when the elongate object is a jotting implement 200 as illustrated in FIG. 10. Jotting implement 200 is a pen whose tip 202 is a writing nib in contact with a plane surface 204 of a sheet of paper 206 on a tabletop 208. Pen 200 has a center axis C.A. aligned with the Z axis in Euler rotated pen coordinates (X,Y,Z). An inclination angle θ corresponding to second Euler angle is shown with respect to Z' axis which also represents a surface normal.

A housing 210 is mounted at a top end 212 of pen 200. Housing 210 has an emitter for emitting a probe radiation 214 and a detector for detecting the intensity of a back-scattered portion 216 of probe radiation 214. Further, housing 210 contains optics for guiding and shaping probe radiation 214 into a number of collimated scan beams 218A, ..., 218D and for receiving and guiding back-scattered portion 216 returning to pen 200. Housing 210 also has a scanning arrangement with a number of scan arms equipped with scan mirrors for projecting scan beams 218A, ... 218D onto surface 204 in search of invariant features 220. In addition, housing 210 contains a computing unit for deriving the absolute position of nib 202 on surface 204 of paper 206 from the reaction of surfaces 204, 208 and invariant features 220 to probe radiation 214. Since the elements in housing 210 and their operation have been described above they will not be called out in detail in this embodiment.

During operation a user holds pen 200 in hand 222 and moves it while contacting surface 204 to produce marks representing handwriting, for example. Hand 222 is indicated in a dashed outline for better visualization. A pressure sensor or other device (not shown) ascertains contact between nib 202 and surface 204. While the user is jotting, scan beams 218A, 218D are emitted from housing 210 at angles $\sigma_A$, ... $\sigma_D$ to axis C.A. to illuminate paper surface 204. Angles $\sigma_A$, ... $\sigma_D$ are varied to produce scan patterns 224A, ..., 224D traced out by corresponding scan points $P_A$, ... $P_D$. Scan patterns 224A, ..., 224D can be any known uniaxial or biaxial patterns including patterns such as Lissajous figures. Scan patterns 224A, ..., 224D are preferably traced out on time scales smaller than any significant movement of hand 222. Thus, absolute position of nib 202 can be determined by the computing unit in a "freeze-frame" fashion.

Figure 11:
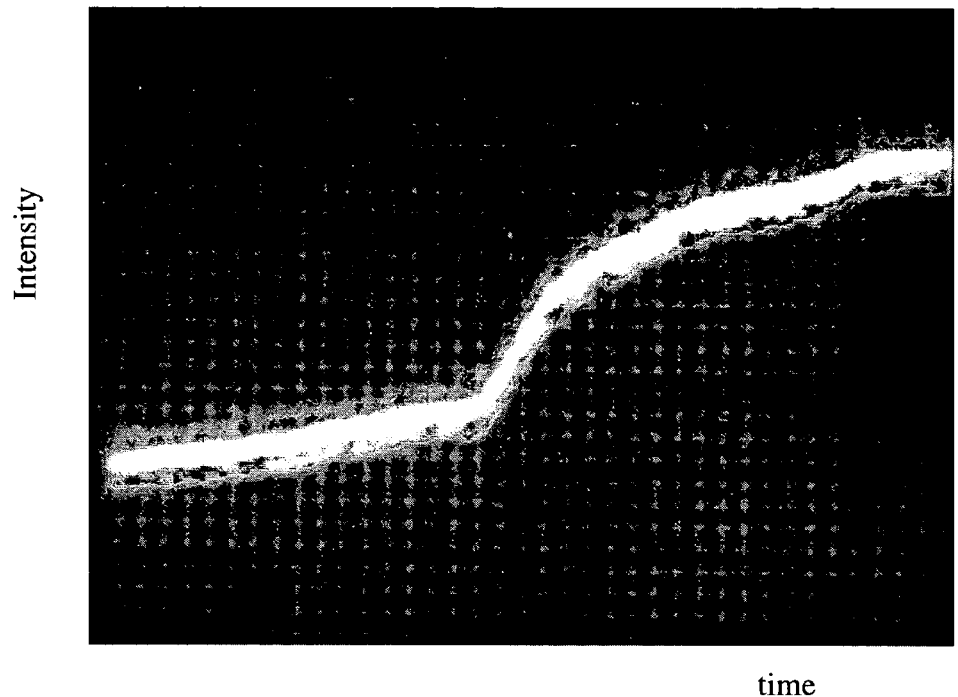
FIG. 11 is a graph showing a relative intensity change corresponding to a back-scattered portion from a scan beam crossing an invariant feature.

Before deployment of pen 200 it is preferable to calibrate the BRDF of paper surface 204 and table top 208 for back-scattered portion 216. This will enable the computing unit to distinguish between back-scattered portion of probe radiation 214 returning from paper surface 204 and tabletop 208. A BRDF for paper that is inked and non-inked can be found in literature such as Morgan T. Schramm and Gary W. Meyer, "Computer Graphic Simulation of Light Reflection from Paper", IS&T PICS Conference, 1998, pp. 412–423. Of course, the method of the invention does not require knowledge of the BRDF, since it can rely on relative changes in intensity in back-scattered portion 216 rather than its absolute intensity to detect invariant landmarks 220. The graph in FIG. 11 illustrates a typical relative change in intensity of back-scattered portion 216 detected when scan point $P_A$ crosses invariant landmark 220B which is an edge of paper 206.

Pen 200 uses back-scattered radiation to derive the absolute position of nib 202. Therefore, angles $\sigma_A$, ... $\sigma_D$ at which scan beams 218A, ..., 218D are emitted are equal to angles $\sigma_A, \ldots \sigma_D$ at which back-scattered portion 216 from each corresponding scan beam 218A, ..., 218D returns to pen 210.

Figure 12:
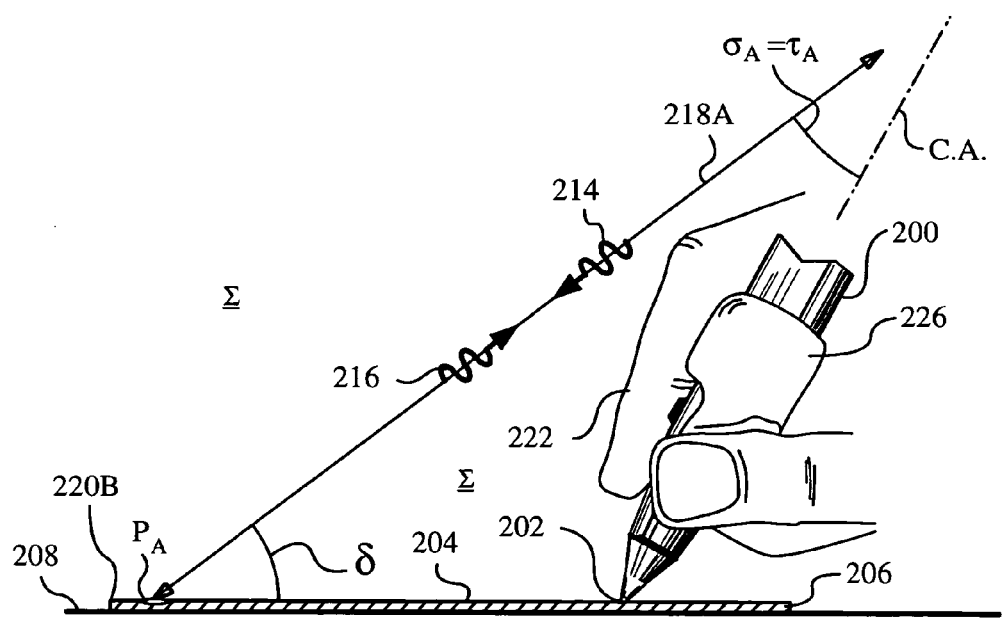
FIG. 12 is a side view illustrating a unit for limiting the variation of Euler angle ψ in the jotting implement of FIG. 11.

In obtaining the absolute position of nib 202 it is necessary to learn Euler angles θ and ψ, as explained above. To simplify this task and confine the scans to known planes, e.g., with respect to the Σ plane at ψ=π/2, one can equip pen 200 with a roll-fixing grip 226, as shown in FIG. 12. In this manner third Euler angle ψ can be fixed for scan beams 218A, ... 218D. This leads to a significant reduction in the processing required to match any calibrated intensity graphs in look-up tables supplied to the computing unit with measured intensity graphs of back-scattered portion 216 corresponding to each scan beam 218A, ..., 218D.

Referring back to FIG. 10, while scan patterns 224A, ..., 224D are traced out on paper surface 204 and tabletop 208 scan points $P_A, \ldots, P_D$ move over invariant features 220. In particular, scan point $P_A$ produced by scan beam 218A moves from paper surface 206 to tabletop 208 across edge 220B at a crossing point $C_1$, then passes over invariant feature 220A. At crossing point $C_1$ back-scattered portion 216 of probe radiation 214 responds to edge 220B with a variation in relative intensity analogous to that illustrated in the graph of FIG. 11. Feature 220A produces a more complex response at crossing points $C_2$ and $C_4$ corresponding to the edges of feature 220A and point $C_3$ corresponding to an internal structure of feature 220A. The internal structure can be another invariant feature, a macro-structure of feature 220A a micro-structure of feature 220A or any other physical attribute of feature 220A producing a response in back-scattered portion 216 that can be observed in change of relative intensity or other radiation characteristic, e.g., a polarization state, of back-scattered portion 216.

In continuing scan pattern 224A scan point $P_A$ crosses edge 220B again at crossing point $C_5$ and then passes over feature 220C on paper surface 204. Feature 220C is a user-defined feature, specifically, a handwritten letter. Scan point $P_A$ crosses letter 220C at crossing points $C_6$, $C_7$ and $C_8$. Then, scan point $P_A$ crosses invariant feature 220D generating two crossing points associated with its edges and two associated with its internal structure. In this case, the internal structure is the micro-structure of paper 206. Meanwhile, scan point $P_B$ moves as dictated by scan pattern 224B of scan beam 218B encountering no invariant features. The response of back-scattered portion 216 from scan beam 218B is limited to the response of paper surface 204 and can serve for calibration purposes. Scan beams 224C and 224D send scan points $P_C$, $P_D$ across invariant features 220E, 220F, 220H and 220I. An invariant feature 220G in the form of micro-structure of tabletop 208 is not crossed. It should be noted that feature 220G can be used as invariant feature only if paper 206 does not move on tabletop 208. The same condition holds for feature 224A.

It is important to ensure that invariant features 220 and preferably also paper surface 206 produce a measurable response in back-scattered portion 216 of probe radiation 214. This is ensured through adjustment of the parameters of probe radiation 214 such as power level, wavelength and/or polarization state. If necessary, the wavelength can be adjusted depending on the response to probe radiation 214 of invariant features to be observed. The absolute position of nib 202 is derived by the computing unit based on intensity variations of back-scattered portion 216 from all scan beams 224A, ..., 224D and knowledge of the position, geometry of some or all features 220 with respect to a world origin and the structure of features 220. The world origin in the embodiment shown is the top right corner of paper 206.

Figure 13A:
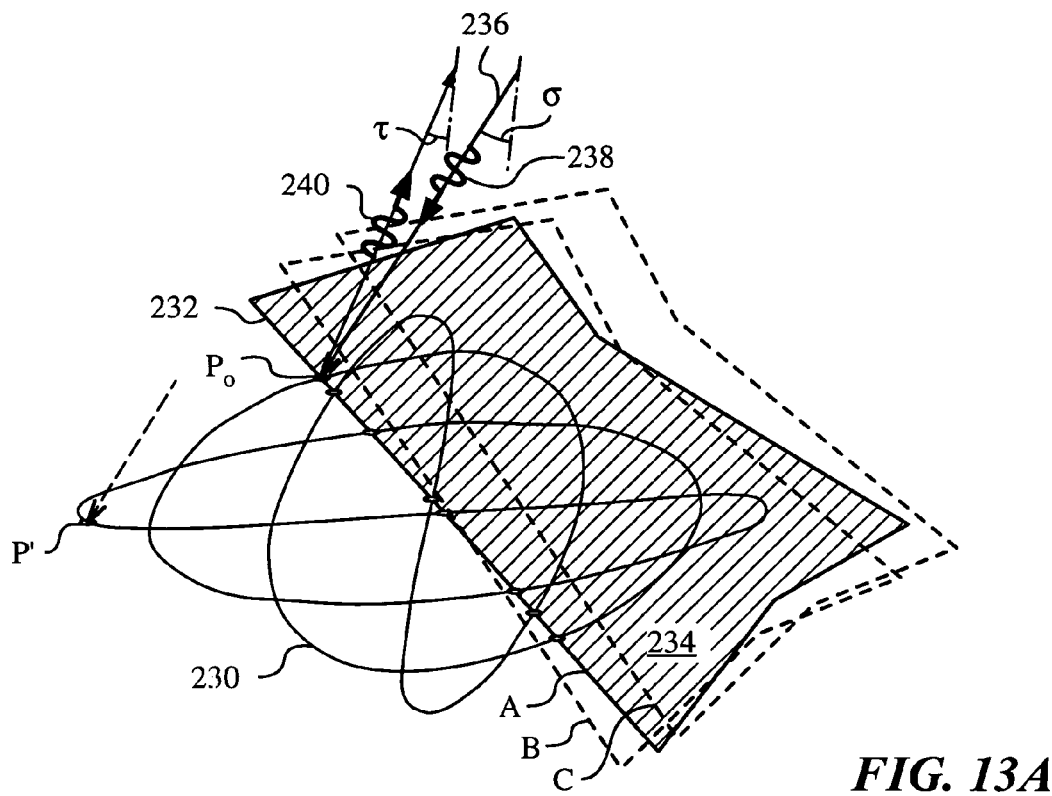
FIG. 13A is a partial view illustrating a mode of using a Lissajous figure for tracking the movement of an invariant feature.

FIG. 13A illustrates a preferred method of employing a Lissajous FIG. 230 as the scan pattern in scanning an edge 232 of a sheet of paper 234 with a scan beam 236 to track movement. Scan beam 236 produces a scan point $P_o$ at which a probe radiation 238 is scattered in the form of a scattered portion 240 from a surface 242 of paper 234. Note that in this case scattered portion 240 returning to the pen (not shown) at an angle τ different from angle σ is detected, i.e., scattered portion 240 is not a back-scattered portion.

Scan point $P_o$ crosses edge 232 at eight crossing points. As sheet of paper 234 and Lissajous FIG. 230 move with respect to each other, as indicated in dashed lines, the crossing points on edge 232 move as well. Now, the crossing times viewed in the phase space of Lissajous FIG. 230 corresponding to these crossing points also move. In fact, their number reduces to seven in one of the indicated positions. Therefore, tracking the motion of edge 232 in the phase space of Lissajous FIG. 230 or locking to edge 232 is convenient. Furthermore, with knowledge of the phase space location of crossing times the power of scan beam 236 can be reduced or even turned off at times significantly different from the crossing times to conserve power, as indicated in position P'.

Figure 14A:
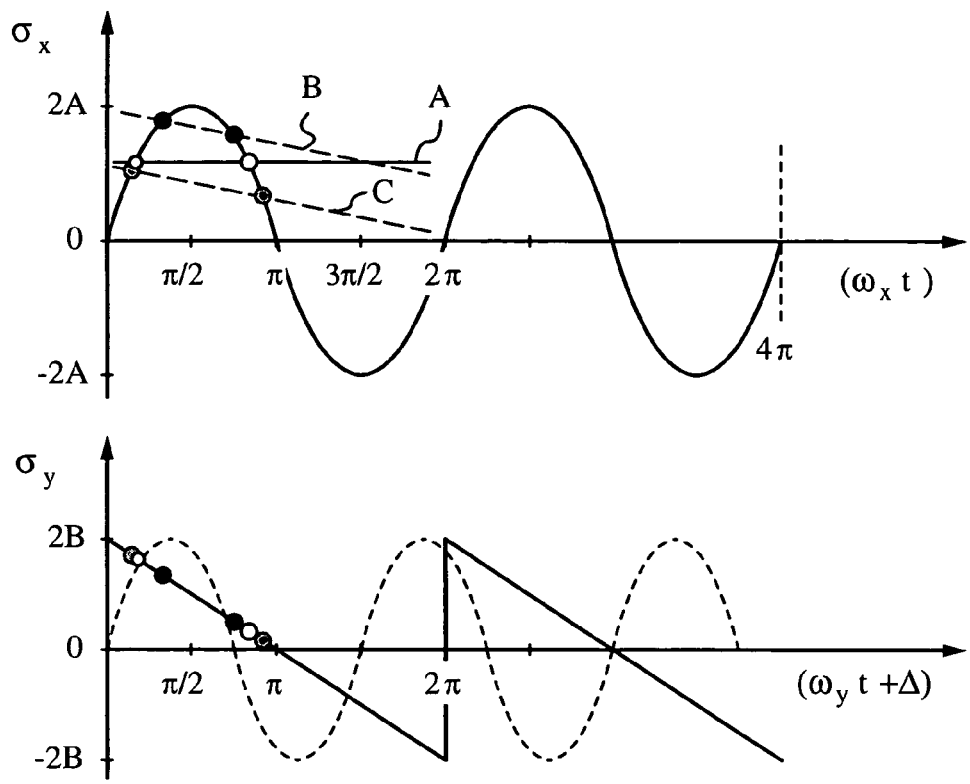
FIGS. 14A&B are phase diagrams for temporal analysis of the scattered portion illustrating a phase signature of a moving line obtained in a scan employing a collapsed Lissajous figure.
Figure 14B:
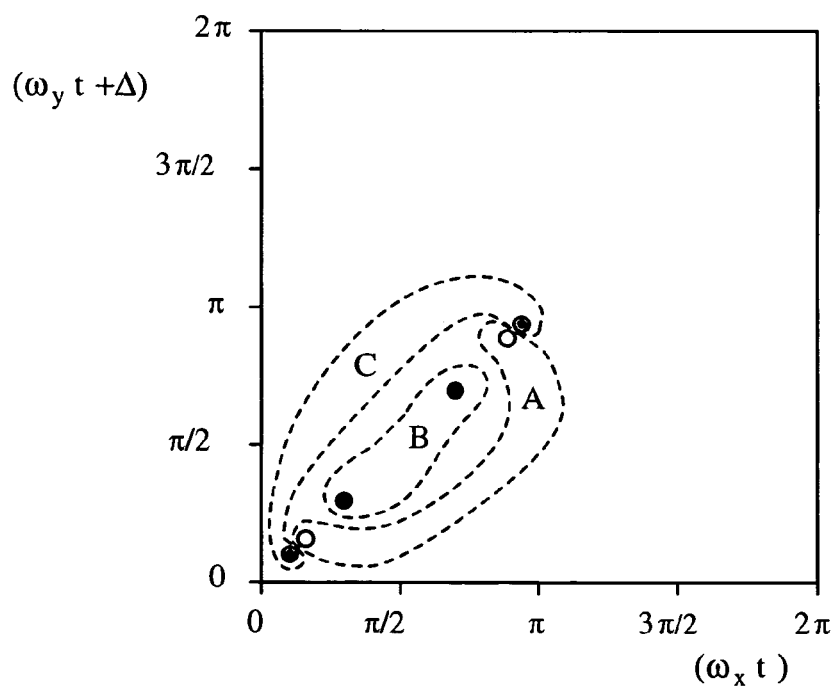

For a clearer understanding, FIG. 14A illustrates a phase diagram for a temporal analysis of the movement of edge 232 over a 2π cycle when Lissajous FIG. 230 is collapsed to one of its uniaxial components. In this case x-component $\sigma_x$ of angle σ varies while the other uniaxial component, y-component component $\sigma_y$, is a cyclic ramp with the same phase difference (Δ=0) and angle μ is zero. Normal variation of y-component $\sigma_y$ required to produce Lissajous FIG. 230 is indicated in dashed lines. Note the movement of the crossing points between positions A, B and C of edge 232. It is also important to note that the geometry of some invariant features can be recognized in phase space once the pose of the pen is known. FIG. 14B illustrates phase space signatures of edge 232 in positions A, B and C.

Figure 13B:
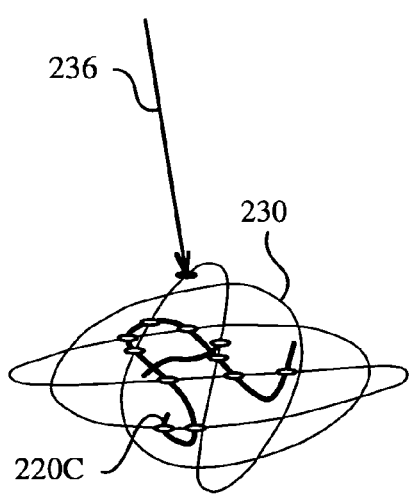
FIG. 13B is a partial view illustrating another mode of using a Lissajous figure for recognizing a stationary invariant feature.

Invariant feature 220C can be recognized based on a phase space signature corresponding to the crossing times of Lissajous FIG. 230 as illustrated in FIG. 13B. The size of Lissajous FIG. 230 is reduced when feature 220C is small by decreasing amplitudes A and B. The same can be done to lock or dither across small portions of larger invariant features such as edges. In still other embodiments, Lissajous FIG. 230 can be re-sized and repeatedly passed across one or more invariant features to recognize the phase space signature.

Figure 15:
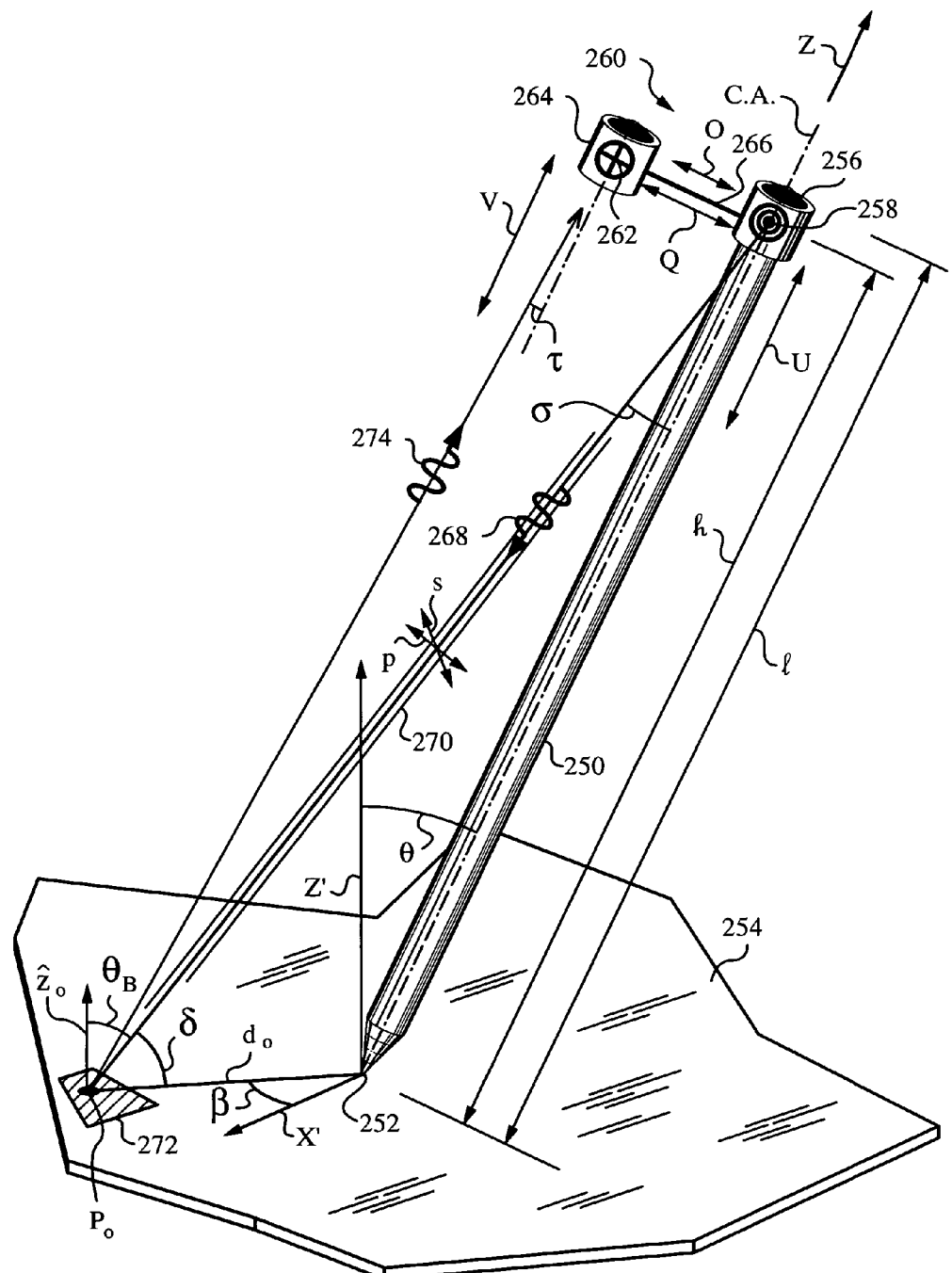
FIG. 15 is a three-dimensional view of an elongate object using a polarization state of probe radiation and the Brewster condition to aid in recovering the pose of the object for deriving the absolute position of its tip.

FIG. 15 illustrates another embodiment of an elongate object 250 having a tip 252 resting on a plane surface 254 of an object of a dielectric material. Object 250 has a housing 256 with an emitter 258 mounted at its top end 260. Emitter 258 is at a height h and object 250 has a length l. A detector 262 in another housing 264 is mounted at an offset from emitter 258 on an arm 266 of length Q. In fact, as indicated by arrows O, U, and V emitter and detector 258, 262 can be offset from each other in various configurations.

Emitter 258 illuminates surface 254 with probe radiation 268 in a collimated scan beam 270 at an angle σ to center axis C.A. A scanning arrangement or another device (not shown) for varying angle σ is provided in housing 258. In addition, a polarization state of probe radiation 268 is controlled. In fact, probe radiation 268 can be linearly polarized in the p polarization state as indicated by an arrow. Alternatively, probe radiation 268 can be in the linear s polarization state, also indicated by an arrow, or in a general elliptical polarization state.

Scan beam 270 of probe radiation 268 illuminates surface 254 and an invariant feature 272. More precisely, scan beam 270 is incident on surface 254 at an angle of incidence δ to surface 254 at a scan point $P_o$. Invariant feature 272 and surface 254 produce a response in a scattered portion 274 of probe radiation 268. Scattered portion 274 returns to elongate object 250 at an angle τ with respect to center axis C.A. and is detected by detector 262. The scattering depends on the polarization state of probe radiation 268 and the orientation of the polarization to surface 254 of the dielectric material at scan point $P_o$.

For certain incident directions scattering exhibits a variation because of the Brewster condition. In the case shown, ψ=π/2 and δ corresponds to the Brewster angle $θ_B$ defined from the surface normal (rather than from surface 254). Under these conditions p-polarized probe radiation 268 will enter surface 268 and travel deep inside the dielectric material. When surface 254 is a paper surface in particular, probe radiation 268 will experience significant absorption because of the internal structure of paper. Therefore, the intensity of scattered portion 274 from surface 254 detected by detector 262 will show a drop-off. The drop-off may or may not differ on feature 272, depending on its structure, e.g., micro-structure, and whether it influences Brewster angle $θ_B$. Note that by adjusting two parameters, namely, angle σ and linear polarization state of probe radiation 268, a condition for probe radiation 268 impinging surface 254 with p polarization at Brewster's angle $θ_B$ can be obtained.

Now, when ψ=π/2 and δ corresponds to $θ_B$ as measured from the surface normal $ẑ_o$, then detector 262 will detect a drop in the intensity of scattered portion 274. For a set angle σ this condition occurs for a critical value of inclination angle θ. Hence, a computing unit can use the drop of the signal corresponding to scattered portion 274 as an indication that inclination angle θ has reached the critical value. A look-up table can be constructed to map this critical value at other values of the third Euler angle ψ. Thus, the polarization state of probe radiation 268 is used as the radiation characteristic for deriving the absolute position of tip 252 by helping to determine angles θ and ψ when illuminating surface 254 near Brewster's angle. In determining the pose of object 250 one can additionally determine angles θ and ψ over a broader range by using other methods and/or devices such as an inclinometer.

Figure 16:
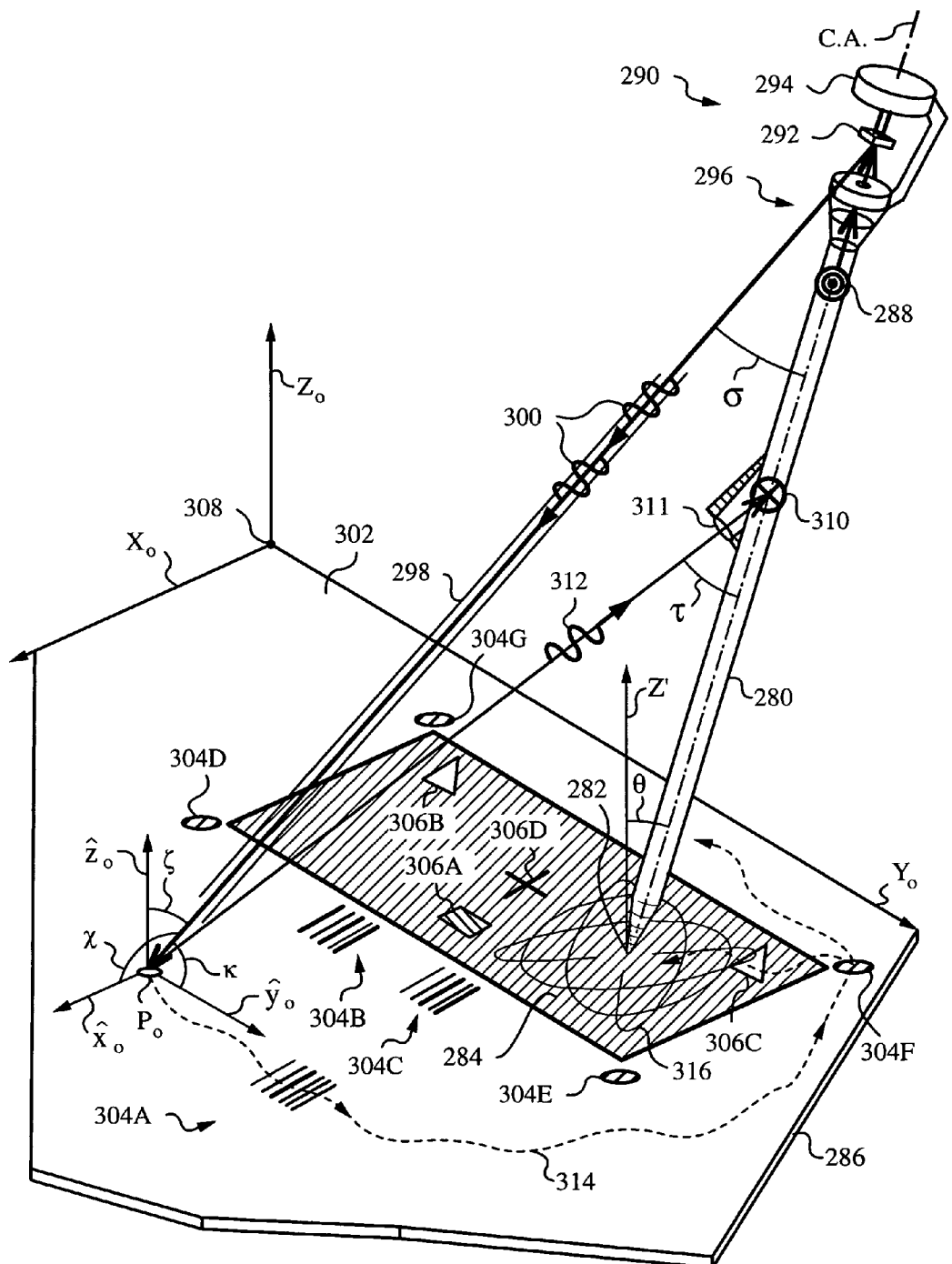
FIG. 16 is a three-dimensional view of another embodiment of the invention in which the elongate object is a stylus for jotting on a screen.

FIG. 16 shows another elongate object 280, here in the form of a stylus with a tip 282. In this embodiment, stylus 282 is for jotting on a plane surface 284, in this case a screen. Screen 284 can belong to a computer, a personal assistant, a pad, a cell phone or any other input device or terminal. In fact, plane surface 284 can itself be a display or a pad, e.g., an electronic pad. In the present case screen 284 belongs to an electronic tablet 286.

Stylus 280 has an emitter 288 mounted in its body and a scanning arrangement 290 equipped with a biaxial scan mirror 292 and a biaxial driver 294. Scanning arrangement 290 has a beam shaping and guiding system 296 for delivering a scan beam 298 of probe radiation 300 emitted by emitter 288 to biaxial scan mirror 292. Scan mirror 292 is centered on center axis C.A. of stylus 280 and directs scan beam 298 at a plane surface 302 of tablet 286. Note that screen 284 is substantially co-planar with surface 302.

Surface 302 has a number of invariant features 304 and screen 284 also has a number of invariant features 306. Features 304 include markings 304A, 304B, 304C here in the form of bar codes, and screen corner designations 304D, 304E, 340F, 304G.

In the present case bar codes 304A, 304B, 304C not only provide geometric information at fixed locations with respect to a world origin 308, but they also encode binary data that can be processed as taught in the art of bar-code scanners, for example. Such data can include, but is not limited to the type of tablet 286 and its operating software and applications. World origin 308 is a corner of tablet 286, though any other convenient point on surface 302 can be used as world origin 308. Corner designations 304D, . . . , 304G provide geometric information with respect to world origin 308 and have micro-structure encoding distance and direction to screen 284. This can be done by providing a micro-structure of varying reflectivity as a function of position within each corner designation 304D, . . . , 304G. Features 304A, 304B, . . . , 304G are permanent invariant features.

Invariant features 306 include a permanent marking 306A on screen 284 and three markings 306B, 306C and 306D that are displayed by screen 284. Markings 306B, 306C and 306D are temporary invariant features projected on screen 284. For example, markings 306B and 306C are associated with a particular operational mode of the screen including but not limited to a user application or a data input mode. Permanent marking 306A may be an activation button that activates screen 284 when touched by tip 282, for example. Marking 306D is a projected feature displayed on screen 284 for centering purposes. Marking 306D can also be used as an alternative world origin or secondary world origin.

Stylus 280 has a detector 310 for detecting a scattered portion 312 of probe radiation 300 returning to stylus 280 at an angle τ to center axis C.A. A lens 311 is provided to filter out all radiation that is not back-scattered portion 312 of probe radiation 300 returning at angle τ. Detector 310 is connected to a computing unit (not shown) for deriving the pose of stylus 280 and obtaining the absolute position of tip 282.

During operation, scan beam 298 produces a scan point $P_o$ that travels on surface 302 in a biaxial scan pattern 314. Scan pattern 314 is in fact a first scan pattern employed by scanning arrangement 290 to locate features 304 and determined from those the characteristics of tablet 286 and the location and orientation of screen 284 on surface 302. Once on screen 284, a second scan pattern 316 is employed to track the absolute position of tip 282 on screen 284. Note that the center of scan pattern 316 is missing because it is obscured by the body of stylus 280.

Figure 17:
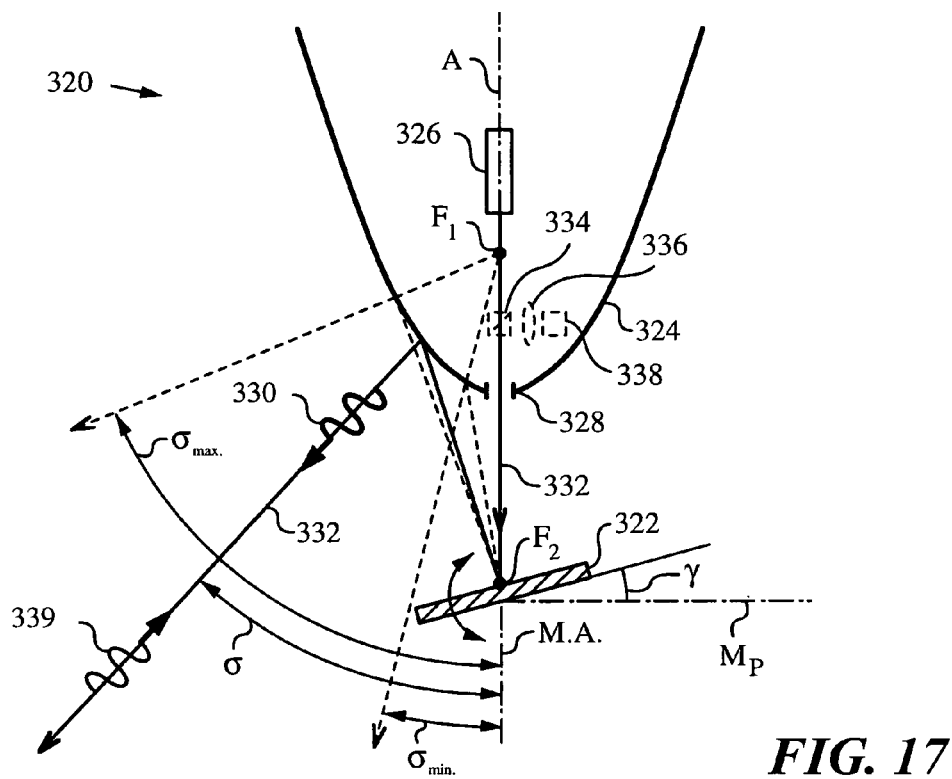
FIG. 17 is a cross-sectional side view of an alternative scanning arrangement.

FIG. 17 illustrates an alternative scanning arrangement 320 with a biaxial scan mirror 322. Scanning arrangement 320 has a hyperbolic mirror 324 centered on an axis A and defined by foci $F_1$ and $F_2$. An emitter 326 is mounted within mirror 324 and an aperture 328 is provided in mirror 324 on axis A for passing a probe radiation 330 collimated in a scan beam 332 to biaxial mirror 322. The position at which probe radiation 330 impinges biaxial mirror 322 is $F_2$, thus ensuring that focus $F_1$ corresponds to the viewpoint of arrangement 320.

Biaxial mirror 322 has a rest position in a mirror plane $M_P$ and is deflected by deflection angle y using a driver (not shown). Scan beam 332 propagates from emitter 326 along axis A that is collinear with a mirror axis M.A. of scan mirror 322. It then passes through focal point $F_1$ and aperture 328 and is incident on scan mirror 322. Mirror 322 reflects scan beam 332 at twice deflection angle γ to the reflecting surface of hyperbolic mirror 324. Mirror 324 amplifies angle γ as shown and directs scan beam 332 at angle σ to axis A to illuminate a plane surface with invariant features. Note that a minimum angle $σ_{min}$ and a maximum angle $σ_{max}$ of scanning arrangement 320 are determined by scan mirror 322 and hyperbolic mirror 324, respectively.

Scanning arrangement 320 can be used in any of the previous embodiments and can be mounted on center axis C.A. such that axis A and C.A. are collinear. For example, arrangement 320 can be equipped with a beam splitter 334, a lens 336 and a detector 338 to detect a back-scattered portion 339 of probe radiation 330.

Figure 18:
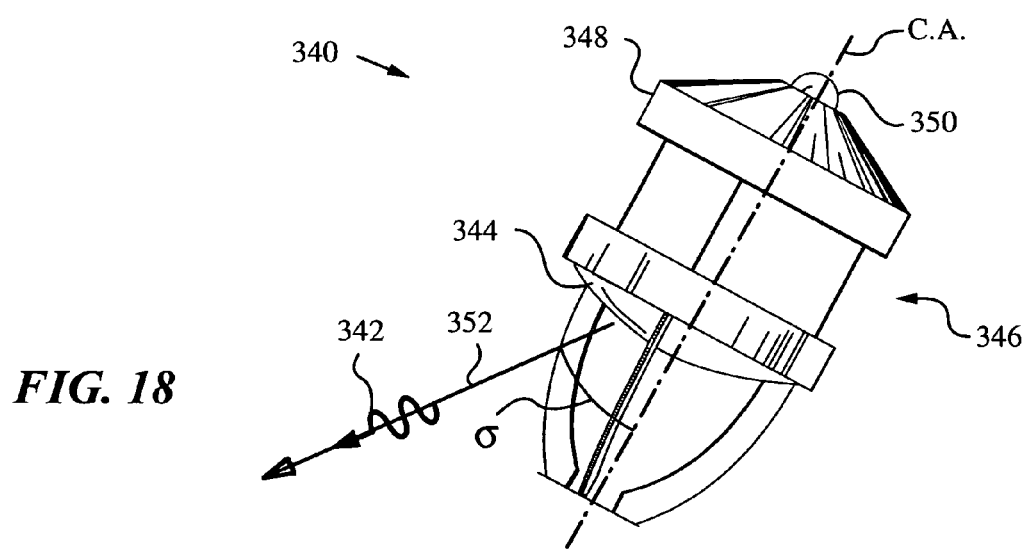
FIG. 18 is an isometric view of a top portion of an elongate object employing a light guiding optic.

FIG. 18 illustrates a portion of another alternative arrangement 340 for guiding a probe radiation 342 using a light guiding optic 344. Optic 344 is mounted in a head 346 below a housing portion 348 containing an emitter 350 of probe radiation 342. Optic 344 can be a holographic, refractive or diffractive element for varying or determining angle σ. In fact, reflective elements, such as a rotating reflective elements, or even refractive elements, such as rotating prisms can be used as optic 344. Optic 344 can replace a scanning arrangement and can be used in any of the above embodiments to vary or determine angle σ. Optic 344 is compatible with a scan beam 352 of probe radiation 342, as shown. Alternatively, optic 344 can perform a spatial filtering function on probe radiation 342 incident on it over a large solid angle of incidence, and only permit probe radiation 342 to exit from it at an exit angle equal to angle σ.

A person skilled in the art will recognize that there exists a plethora of optical elements and arrangements that permit requisite guiding, shaping, steering and/or deflecting of probe radiation. It should also be noted, that an emitter can have more than one radiation source depending on the wavelengths to be included in the probe radiation.

Figure 19:
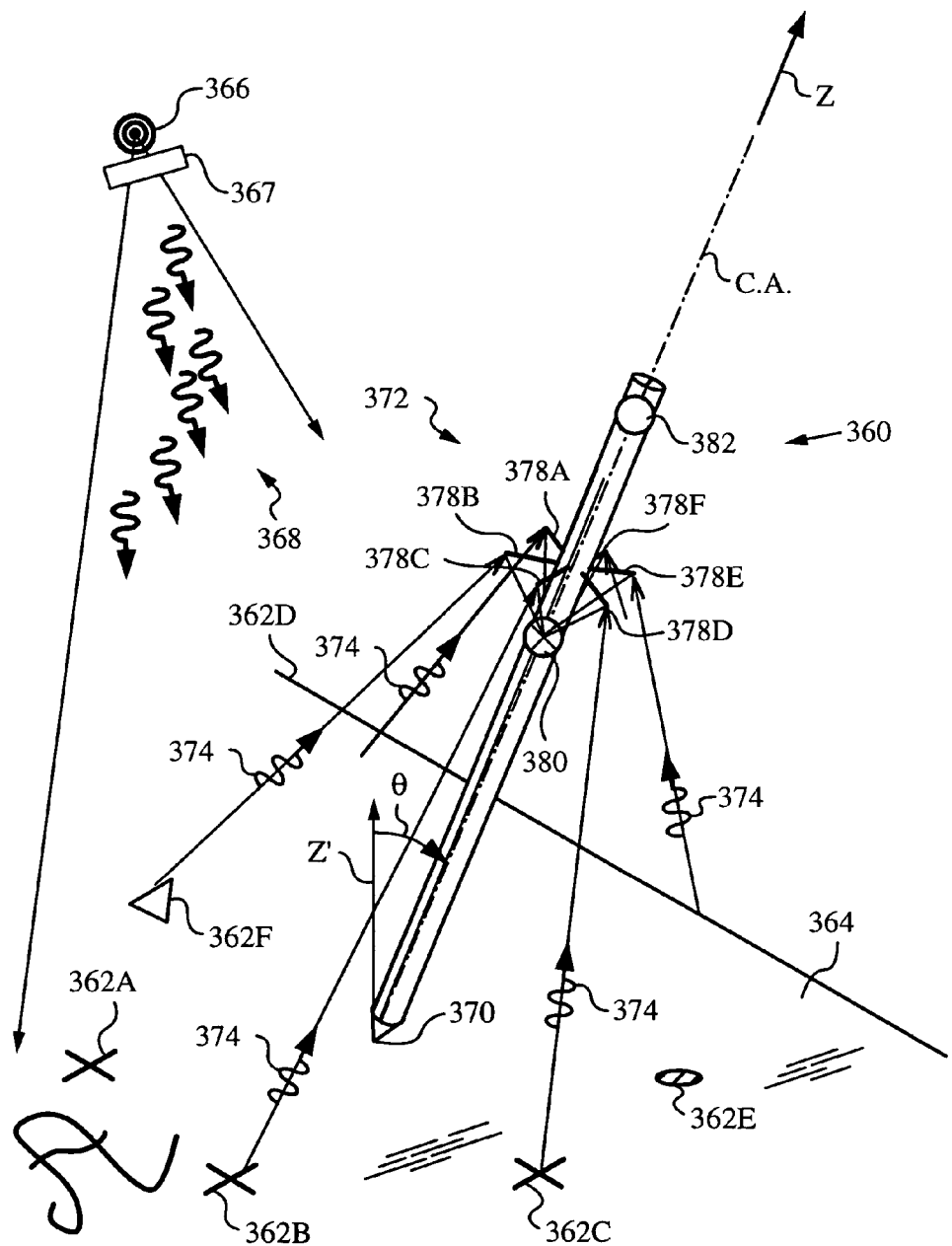
FIG. 19 is a three-dimensional view of another elongate object using temporary invariant features and permanent invariant features for navigating on a plane surface.

FIG. 19 illustrates a three-dimensional view of another elongate object 360 using temporary invariant features 362A, 362B, 362C and permanent invariant features 362D, 362E, 362F for navigation on a plane surface 364. Feature 362D is an edge of surface 364. Feature 362E is a feature with macro-structure and micro-structure and feature 362F is a feature with geometric information. The position and orientation of features 362D, 362E, 362F with respect to a world origin (not shown) is known.

A source 366 is provided for supplying a probe radiation 368. Source 366 can be an ambient radiation source such as a lamp providing ambient radiation 368. In general, source 366 can be any natural radiation source providing narrow-band or broadband probe radiation 368 including daylight. In the present embodiment source 366 is a laser source providing coherent probe radiation 368 at a single frequency f.

Elongate object 360 has a tip 370 contacting surface 364. Source 366 illuminates surface 364 and permanent features 362D, 362E, 362F. In addition, with the aid of a projection device 367, such as, e.g., a mask, a holographic element or a diffraction element, source 366 projects temporary invariant features 362A, 362B and 362C on surface 364. Of course, separate sources can be used for providing ambient radiation 368 and projecting invariant features 362A, 362B, 362C. Any type of technique for created projected features 362A, 362B and 362C can be used. In the present embodiment projected features 362A, 362B, 362C are cross patterns. Their location with respect to world origin is preferably predetermined. Alternatively, their location with respect to the world origin can be determined by cross-referencing with one or more permanent features 362D, 362E, 362F.

Elongate object has an arrangement 372 for receiving a scattered portion 374 of probe radiation 368 arriving at an angle τ to elongate object 360. Arrangement 372 can select an angle τ with respect to its axis, in the present case a center axis C.A. More precisely, arrangement 372 is a scanning arrangement with a number of arms 378A, . . . , 378F and mirrors (not shown) for selecting a different angle τ for each of the arms 378A, . . . , 378F.

A detector 380 is provided for detecting scattered portion 374 of probe radiation 368 arriving at angle τ to axis C.A. at each arm 378A, . . . , 378F. Detector 380 can detect scattered portion 374 arriving at each arm 378A, . . . , 378F in parallel or sequentially. A computing unit 382 in communication with detector 380 is mounted on object 360 for deriving the pose of object 360 from a response of scattered portion 374 to surface 364 and invariant features 362. This response can involve any radiation characteristic including intensity and/or polarization state. Computing unit 382 obtains the absolute position of tip 370 from the pose and knowledge of the invariant features 362.

During operation angle τ is varied to detect permanent and temporary features 362. In fact, angle τ is varied in a scan pattern chosen to most efficiently detect features 362. Eligible scan patterns include uniaxial and biaxial patterns.

By virtue of being formed of projected probe radiation 368, projected features 362A, 362B and 362C are easy to detect by detector 380. This embodiment may be used in situations where determination of absolute position of tip 370 of object 360 is undertaken under poor illumination and/or when permanent features 362D, 362E, 362F are difficult to detect. There are numerous alternatives to this embodiment, including mounting source 366 and device 367 on elongate object 360 or integrating passive scanning arrangement 372 completely or partially with an active scanning arrangement.

Figure 20:
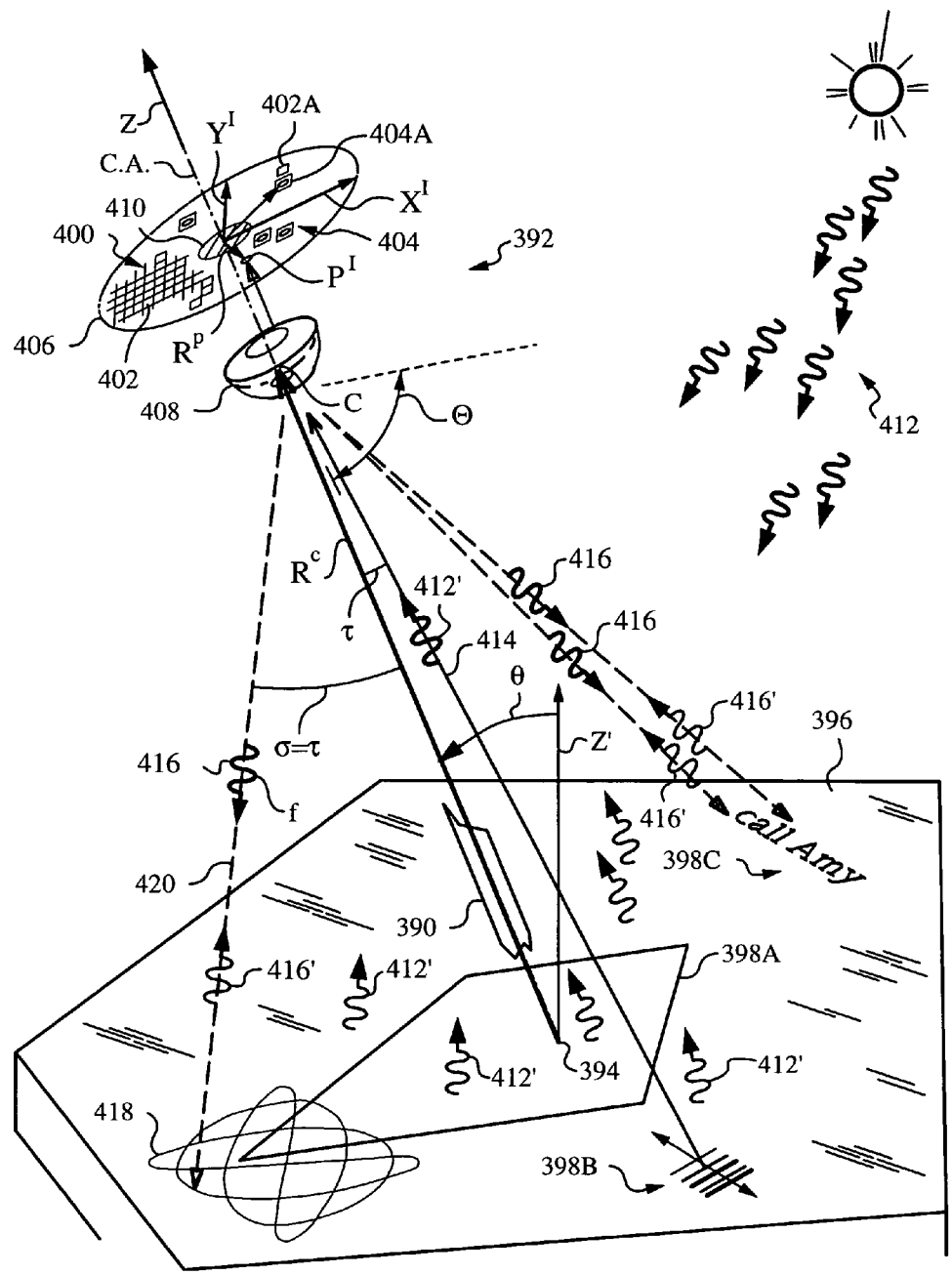
FIG. 20 is a three-dimensional view of yet another elongate object that navigates on a plane surface using an ambient radiation.

Still another embodiment of an elongate object 390 with an apparatus 392 for determining the absolute position of tip 394 contacting a plane surface 396 with invariant features 398 is shown in FIG. 20. Object 390 is aligned along the Z axis, which is collinear with a center axis C.A. that is used for reference to world coordinates. Object 390 is represented only partially for better visualization.

Apparatus 392 has an imaging and projection device 400 in the form of a hybrid array. For more information on hybrid arrays also known as smart pixel arrays the reader is referred to Stefan Sinzinger et al., Microoptics, Wiley VCH, copyright 1999, pp. 247–9. Array 400 has imaging pixels 402 as well as illumination pixels 404 and is located in an image plane 406 defined by an optical system 408. Preferably, optical system 408 has a wide field of view and substantially a single viewpoint. In the present embodiment system 408 has a single viewpoint at point C and a field of view surrounding but not including axis C.A. as defined by solid angle Θ. The central obscuration of the field of view of system 408 produces a corresponding central shadow 410 in image plane 406. System 408 may include various optics including refractive, reflective and/or catadioptric optics accompanied by optical relays, mirrors, apertures, field flatteners and other elements, as will be appreciated by one skilled in the art.

Image plane 406 is described by orthogonal axes $X^I$, $Y^I$. These axes are parallel to axes X and Y of rotated object coordinates (not shown in this drawing). Also, a vector $R^c$ is drawn from the origin of rotated object coordinates to single viewpoint C.

During operation, ambient radiation 412 such as sunlight that is incident on surface 396 is used as probe radiation. A scattered portion 412' of ambient radiation 412 travels to elongate object 390 at an angle τ to central axis C.A. More precisely, scattered portion 412' such as that propagating along path 414 and arriving within solid angle Θ is imaged by optical system 408 on image plane 406 at image point P'. The response of scattered portion 412' to surface 396 and features 398A, 398B is used to determine the absolute position of tip 394 in accordance with any technique for recovering position from a perspective image of surface 396 and features 398 produced on imaging pixels 402 of array 400.

Illumination pixels 404 of array 400 produce a probe radiation 416 that is projected on surface 396 by optical system 408 at angles σ corresponding to the locations of pixels 404 in image plane 406. Preferably, pixels 404 are activated to project a scan pattern 418 on surface 396. As in the previous embodiments, scan pattern 418 can be uniaxial or biaxial. Pixels 404 projecting scan pattern 418 can be turned on sequentially to trace out scan pattern 418 in time, as in the previous embodiments, or simultaneously to continuously project scan pattern 418 on surface 396. It is preferred that probe radiation 416 have a single frequency f and have a certain characteristic such as an intensity level or polarization state that renders it distinguishable from ambient radiation 412.

A scattered portion 416' of probe radiation 416 returns to image plane 406 via optical system 408. More precisely, scattered portion 416' is back-scattered along a path 420 and returns to object 390 at angle τ equal to angle σ. Of course, scattered portion 416' at other angles τ, i.e., not back-scattered, can also be used by apparatus 392. It should be noted that back-scattered portion 416' has to be detected by an imaging pixel 402. Hence, a precisely back-scattered portion 416' can not be used as it is imaged to same illumination pixel 404 that generated probe light 416, i.e., to illumination pixel 404A in the case of back-scattered portion 416' returning along path 420. For this reason an imaging pixel 402A is located next to illumination pixel 404A.

In the present embodiment imaging pixels 402 serve as a scanning arrangement to detect scattered portion 416'. Illumination pixels 404 serve for producing a temporal or spatial scan pattern 418. Illumination pixels 404 can also be used as a projection device for producing temporary invariant features, i.e., projected temporary features on surface 396. It should be noted that projected features may serve functions other than determining the absolute position of tip 394. For example, invariant feature 398C is projected with probe light 416 by a number of illumination pixels 404 to display user information. Scattered portion 416' returning from feature 398C may or may not be employed for determining the absolute position of tip 394.

In some alternative embodiments the illumination and imaging functions can be separated. For example, this can be accomplished by separate imaging and illuminating arrays. In addition, these two arrays can have distinct points of view to take advantage of stereo vision imaging and scanning techniques.

Figure 21:
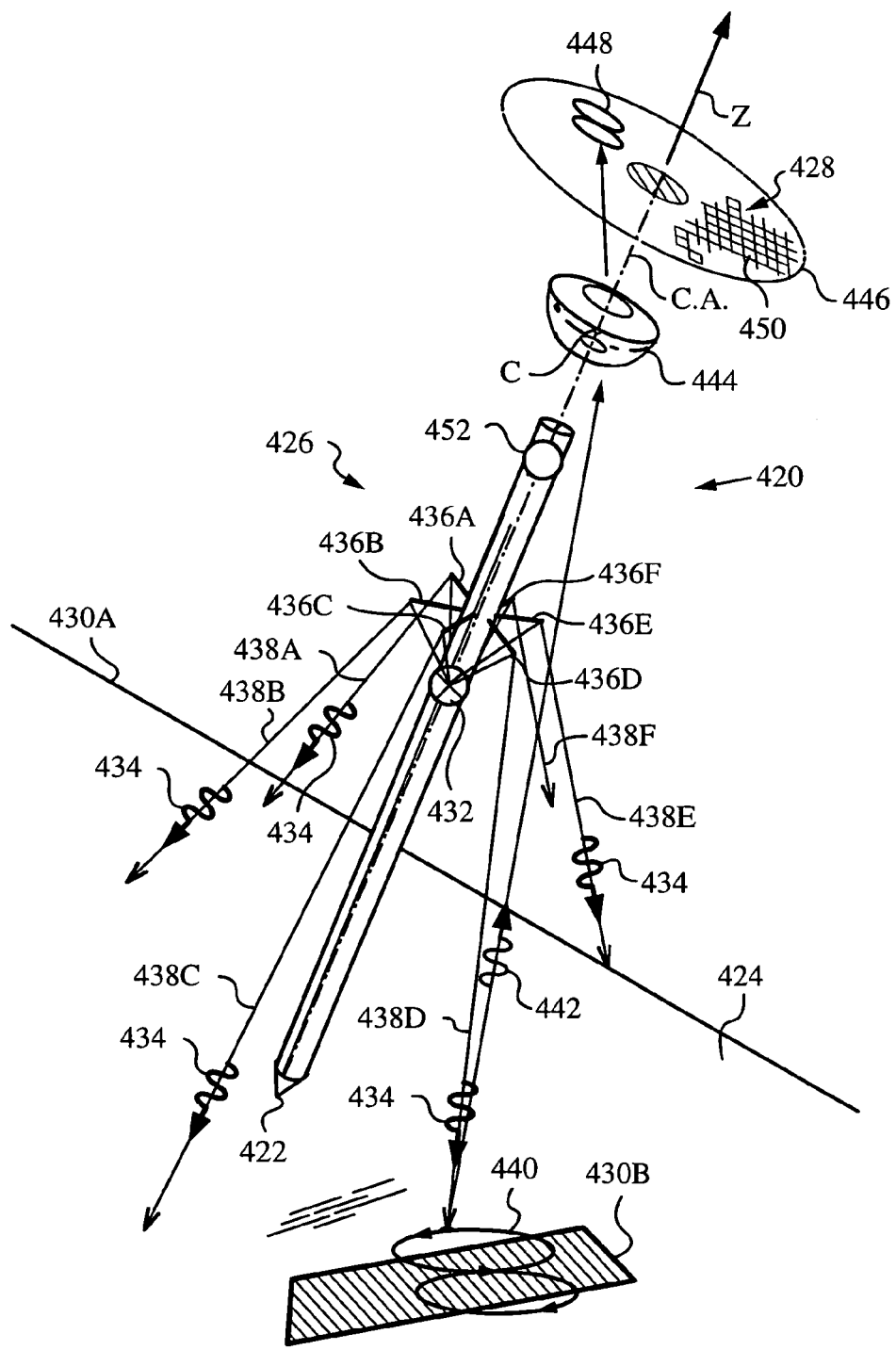
FIG. 21 is a three-dimensional view of an elongate object employing a scanning arrangement and an imaging array.

In an embodiment illustrated in FIG. 21 an elongate object 420 has a tip 422 contacting a plane surface 424. Plane surface 424 has invariant features 430A and 430B. Elongate object 420 is equipped with a scanning arrangement 426 and an imaging array 428. Scanning arrangement 426 has a source 432 of probe radiation 434 and scan arms 436A through 436F for directing probe radiation 434 in collimated scan beams 438A through 438F to surface 424.

In particular, scan beam 438D traces out a biaxial scan pattern 440 on surface 424 crossing invariant feature 430B at a number of points. A scattered portion 442 of probe radiation 434 is imaged on imaging array 428 with the aid of an optical system 444. Optical system 444 is a lens with a substantially single point of view at C and defining an image plane 446. Imaging array 428 is located in image plane 446. Note that the viewpoint of lens 444 is different from the viewpoint from which scan beam 438D is directed at surface 424.

With the aid of lens 444 a perspective image 448 of biaxial scan pattern 440 is imaged on imaging pixels 450 of array 428. The intensities of scattered portion 442 corresponding to scan beam 438D crossing invariant feature 430B as well as the shape of image 448 can be used to determine the pose of elongate object 420. A computing unit 452 is mounted on object 420 for deriving the pose of object 420 and obtaining the absolute position of tip 422 on plane 424. In addition or instead of the techniques discussed above, any suitable technique such as edge analysis can be used for determining pose of object 420 from perspective image 448 of scan pattern 440. Specifically, since the viewpoints of scanning arrangement 426 and optical system 444 are different, the principles of stereo vision including vanishing point analysis can be employed by unit 452.

Figure 22:
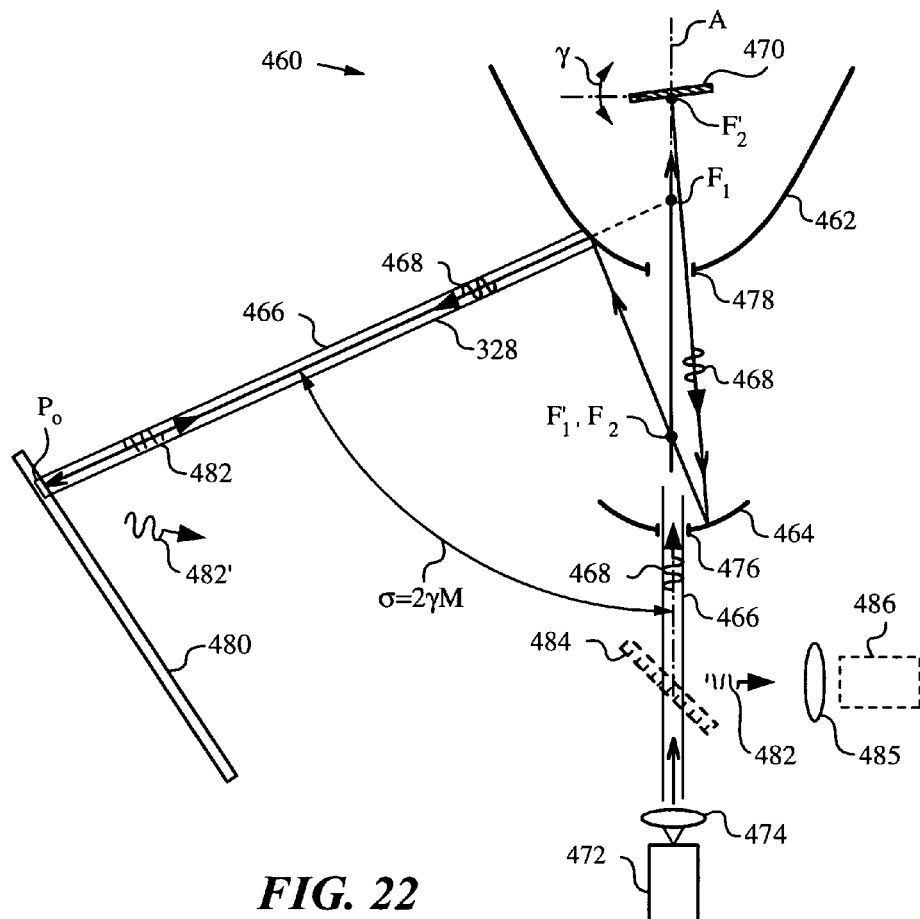
FIG. 22 is a cross-sectional side view of a scanning arrangement employing a hyperbolic mirror.

FIG. 22 is a cross-sectional side view of a scanning arrangement 460 employing a hyperbolic mirror 462 and an ellipsoidal mirror 464 for directing a scan beam 466 of probe radiation 468. Mirrors 462 and 464 share the same optical axis A and their reflective surfaces face each other and are positioned such that a second focus $F_2$ of mirror 462 is coincident with a first focus $F_1'$ of mirror 464. Also, a first focus $F_1$ of mirror 462 is on axis A and a second focus $F_2'$ of mirror 464 is on the surface of a scan mirror 470 used for directing scan beam 466. All foci are on axis A.

Scanning arrangement 460 has an emitter 472, here a light emitting diode, for providing probe radiation 468. An optic 474 collimates or shapes radiation 468 into a narrow cone of light providing a scan beam 466. Collimated or shaped scan beam 466 propagates along axis A through an aperture 476 in mirror 464 and an aperture 478 in mirror 462 to scan mirror 470. Scan mirror 470 is deflected by a deflection angle γ using a drive mechanism (not shown). The reflection angle of scan beam 466 produced by scan mirror 470 is equal to twice deflection angle γ.

After reflection from scan mirror 470 scan beam 466 passes through aperture 478 and is reflected by the reflecting surface of mirror 464 to the reflecting surface of mirror 462. Since scan beam 466 is incident on scan mirror 470 at the second focus $F_2'$ of mirror 464, scan beam 466 is reflected from mirror 464 such that it passes through first focus $F_1'$ of mirror 464 before striking mirror 462. Since first focus $F_1'$ of mirror 464 is coincident with second focus $F_2$ of hyperbolic mirror 462, scan beam 466 is reflected by mirror 462 such that focus $F_1$ is a single viewpoint of scanning arrangement 460.

Scanning arrangement 460 is used to direct scan beam 466 of probe radiation 468 at a plane surface 480 to produce a scan spot $P_o$. The optical configuration of arrangement 460 translates a scan mirror rotation angle y into a scan angle σ with respect to axis A as follows:

$$\sigma = 2\gamma M, \qquad \text{(Eq. 15)}$$

where M is the angular magnification of the optical system made up of mirrors 462 and 464.

Scanning arrangement 460 can be used in any of the above embodiments or in still other embodiments. In some of these embodiments it is convenient to set axis A collinear with a central axis C.A. of the elongate object employing scanning arrangement 460. In some embodiments scanning arrangement 460 can be used in conjunction with an imaging unit in a stereo vision configuration.

In the embodiment shown in FIG. 22, scanning arrangement 470 is used to detect a back-scattered portion 482 of probe radiation 468. Back-scattered portion 482 returns along the same path as probe radiation 468. A beam splitter 484 is provided to deflect returning back-scattered portion 482 to a detector 486 for detection and measurement of the appropriate radiation characteristic, e.g., intensity. A lens 485 can be used to ensure that only back-scattered radiation of back-scattered portion 482 is returned to detector 486.

Figure 23A:
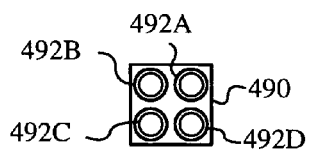
FIG. 23A is a plan view of an emitter having four component emitters for emitting component beams.
Figure 24:
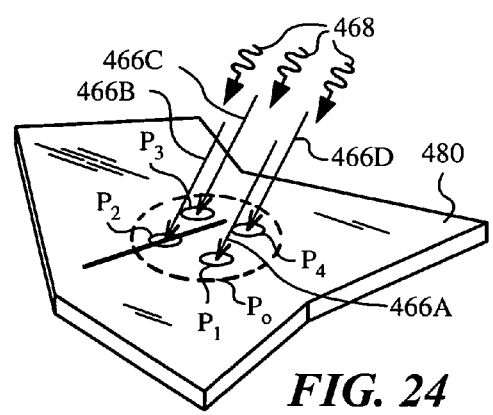
FIG. 24 is a partial three-dimensional view illustrating scanning with four component beams.

Scanning arrangement 470 can be used with a variety of emitters and detectors. FIG. 23A illustrates an emitter 490 having several, in this case four component emitters 492A through 492D. Emitter 490 can be used in arrangement 460 instead of diode 472 for emitting probe radiation 468 in four parallel component beams 466A through 466D instead of a single beam 466. Under these conditions four corresponding scan points $P_1$, $P_2$, $P_3$ and $P_4$ are produced on surface 480, as illustrated in FIG. 24. Note that all scan points are scanned together with the aid of scanning mirror 470. Appropriate component emitters 492A through 492D are lasers such as laser diodes.

Figure 23B:
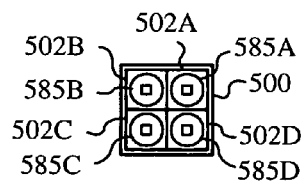
FIG. 23B is a plan view of a detector having four component detectors for detecting sub-portions of the scattered portion of probe radiation.

FIG. 23B illustrates a detector 500, more specifically a detector array, having several, in this case four component detectors 502A through 502D. Component detectors 502A through 502D can be used for detecting sub-portions of the scattered portion of a probe radiation in any of the above embodiments or in still other embodiments. In the present case, detector array 500 is employed in scanning arrangement 460 either without or in conjunction with emitter 490 or emitter 472. When used in conjunction with emitter 490, each component detector can be set to receive sub-portions of back scattered portion 482 of probe radiation 468 corresponding to scan points $P_1$, $P_2$, $P_3$ and $P_4$. In the embodiments using detector array 500, it is preferable to use a lens array comprising lenslets 585A through 585D for ensuring that each component detector 502A through 502D only receives light from the respective sub-portions of back-scattered portion 482 and other scattered light, such as scattered portion 482' is excluded.

Figure 25:
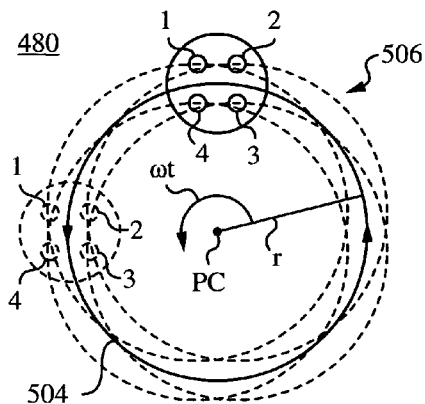
FIG. 25 is a diagram illustrating a biaxial scan pattern employed in scanning a scan beam having four component beams.

The use of four parallel component beams 466A through 466D to scan surface 480 with a biaxial scan of a Lissajous FIG. 504 ($\omega_1/\omega_2=1$, $\Delta=\pi/2$ and A=B) produced by scanning arrangement 460 with four component beams 466A through 466D is shown in FIG. 25. Scan points $P_1$, $P_2$, $P_3$ and $P_4$ are referred to by their subscripts only for clarity. Lissajous FIG. 504 produces a scan pattern 506 of scan points 1, 2, 3 and 4 with a center PC and average radius r=A.

Figure 26A:
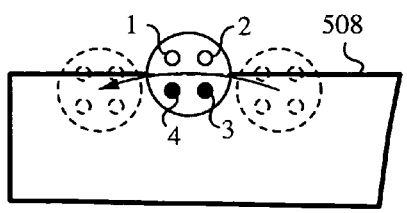
FIG. 26A is a diagram illustrating the crossings by the component beams of FIG. 25 of an invariant feature in the form of an edge.
Figure 26B:
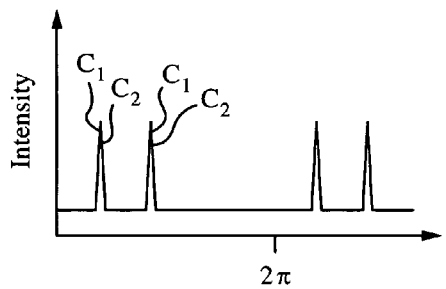
FIG. 26B is a phase diagram for a temporal analysis of the sub-portions of the scattered portion of the component beams in FIG. 26A.

FIG. 26A shows scan pattern 506 used to scan an invariant feature 508, in this case an edge. Only scan points 1 and 2 cross edge 508. In fact, scan points 1 and 2 cross edge 508 twice during every cycle of pattern 506 as better shown by the phase diagram of FIG. 26B. This phase diagram can be used for a temporal analysis of sub-portions corresponding to component beams 466A through 466B as follows. The crossing times of points 1 and 2 are indicated by intensity peaks C and $C_2$, respectively. Since both scan points 1 and 2 cross edge 508 at the same time only two peaks result. This temporal condition or phase condition can be used to recognize the orientation of edge 508 with respect to pattern 506. In this case the orientation is perpendicular. If all four scan points 1, 2, 3 and 4 were to cross edge 508 there would be four peaks in the phase diagram and they would coincide indicating perpendicular orientation. It should also be noted that when center PC of pattern 506 is on edge 508 the peaks are equidistant in phase space. In accordance with the principles of geometry, knowledge of the location of center PC and orientation of pattern 508 with respect to edge 508 can be used in deriving the pose of an elongate object and obtaining the absolute position of its tip on surface 480.

Figure 27A:
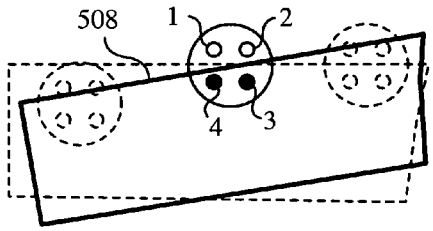
FIG. 27A is a diagram illustrating the crossings by the component beams of FIG. 25 of a rotated edge.
Figure 27B:
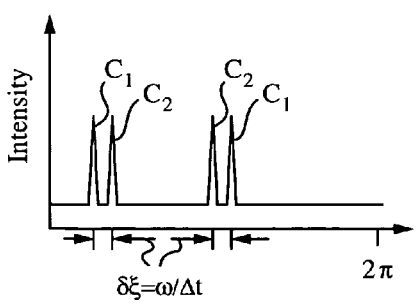
FIG. 27B is a phase diagram for a temporal analysis of the sub-portions of the scattered portion of the component beams in FIG. 27A.

FIG. 27A illustrates pattern 506 crossing edge 508 at a non-perpendicular orientation. The phase diagram of FIG. 27B shows that under this condition the peaks corresponding to crossing times of points 1 and 2 split. In fact, the split is described by a phase delay:

$$\delta\xi = \frac{\omega}{\Delta t}, \qquad (\text{Eq. 16})$$

where $\omega=\omega_1$ is the angular velocity of scan pattern 506 and $\Delta t$ is the delay between crossing times. In addition to indicating the non-perpendicular orientation of scan pattern 506 to edge 508, the phase delay can be used to determine the angle of the scan pattern to edge 508 as well as to determine distances in accordance with the principles of geometry. This information can then be used for deriving the pose of an elongate object and obtaining the absolute position of its tip on surface 480.

Figure 28:
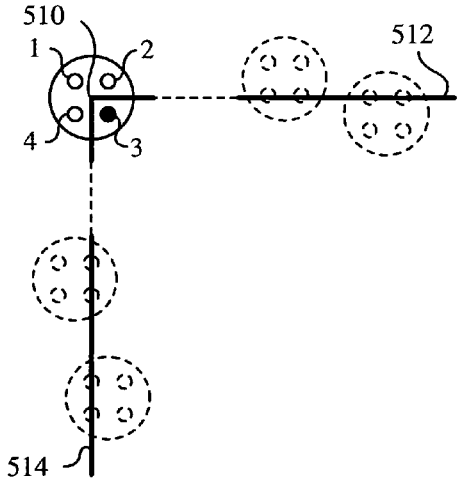
FIG. 28 is a diagram illustrating the crossings by the component beams of FIG. 25 of a corner.

FIG. 28 illustrates how scan pattern 506 of scan points 1, 2, 3 and 4 crosses a corner 510 defined by edges 512, 514. First, all points 1, 2, 3 and 4 cross edge 512. Note that edge 512 may or may not be perpendicular to pattern 506. Thus, in general, all four points 1, 2, 3 and 4 or as few as one point may cross edge 512 depending on the orientation between pattern 506 and edge 512. In the present case all four points cross. Then scan point 4 crosses edge 512 and edge 514 as scan pattern 506 clears corner 510. Finally, all four points cross edge 514. Again, the manner and number of points crossing edge 514 depend on orientation between pattern 506 and edge 514.

A temporal analysis of the crossing times of points 1, 2, 3 and 4 is conveniently performed in phase space. As described above, phase signatures corresponding to edge and corner crossings can be used in determining the pose of an elongate object and in obtaining the relative and absolute position of its tip on a plane surface. In fact, it should be noted that before obtaining an absolute position with respect to the world origin, the position obtained for the tip can be a position relative to an invariant feature whose exact location in world coordinates may need to be corroborated, e.g., from data obtained from other invariant features.

It will be evident to a person skilled in the art that the present invention admits of various other embodiments. Therefore, the scope of the invention should be judged by the appended claims and their legal equivalents.

The invention claimed is:

1. A method for determining a pose of an elongate object having a tip contacting a plane surface having an invariant feature, said method comprising:
   a) illuminating said plane surface and said invariant feature with a probe radiation;
   b) detecting a scattered portion of said probe radiation returning to said elongate object at an angle τ to an axis of said elongate object;
   c) deriving said pose from a response of said scattered portion to said plane surface and to said invariant feature; and
   d) obtaining an absolute position of said tip on said surface from said pose and said invariant feature.

2. The method of claim 1, wherein said probe radiation is directed from said elongate object to said surface at an angle σ to said axis.

3. The method of claim 2, wherein said angle τ corresponds to a back-scatter angle such that said scattered portion is a back-scattered portion.

4. The method of claim 1, wherein said response is an intensity variation in said scattered portion.

5. The method of claim 1, further comprising varying said angle τ at which said scattered portion is detected.

6. The method of claim 5, wherein said angle τ is varied in a scan pattern.

7. The method of claim 1, wherein said probe radiation is directed from said elongate object to said plane surface in a scan beam at an angle σ to said axis.

8. The method of claim 7, wherein said scan beam comprises a number of component beams.

9. The method of claim 7, wherein said angle σ is varied such that said scan beam follows a scan pattern.

10. The method of claim 9, wherein said scan pattern is selected from the group consisting of uniaxial scan patterns and biaxial scan patterns.

11. The method of claim 10, wherein said biaxial scan patterns are selected from the group consisting of raster patterns and Lissajous figures.

12. The method of claim 10, wherein said step of deriving comprises a temporal analysis of said scattered portion.

13. The method of claim 12, wherein said temporal analysis comprises a phase analysis.

14. The method of claim 1, wherein said invariant feature comprises an edge of said plane surface.

15. The method of claim 14, wherein said plane surface comprises a jotting surface.

16. The method of claim 15, wherein said jotting surface is selected from the group consisting of a screen, a display, a pad, a paper surface.

17. The method of claim 16, wherein said invariant feature comprises a micro-structure of said paper surface.

18. The method of claim 16, wherein said invariant feature comprises a macro-structure on said paper surface.

19. The method of claim 18, wherein said macro-structure comprises markings.

20. The method of claim 1, wherein said elongate object is selected from the group consisting of jotting implements, pointers, robotic arms and canes.

21. The method of claim 20, wherein said jotting implements are selected from the group consisting of pens, pencils and styluses.

22. The method of claim 1, comprising deriving at least one Euler angle of said elongate object.

23. The method of claim 1, further comprising producing a temporary invariant feature on said plane surface.

24. The method of claim 23, wherein said temporary invariant feature is a projected temporary feature produced on said plane surface by said probe radiation.

25. The method of claim 24, wherein said projected temporary feature is produced by scanning said probe radiation.

26. The method of claim 1, further comprising producing a feature comprising user information on said plane surface.

27. An apparatus for determining a pose of an elongate object having a tip contacting a plane surface having an invariant feature, said apparatus comprising:
 a) a source for illuminating said plane surface and said invariant feature with a probe radiation;
 b) a detector on said elongate object for detecting a scattered portion of said probe radiation returning to said elongate object at an angle τ to an axis of said elongate object;
 c) a computing unit for deriving said pose from a response of said scattered portion to said plane surface and to said invariant feature, and for obtaining an absolute position of said tip on said surface from said pose and said invariant feature.

28. The apparatus of claim 27, wherein said source comprises an emitter on said elongate object.

29. The apparatus of claim 28, wherein said emitter comprises a number of component emitters for emitting a corresponding number of component beams for illuminating said plane surface and said invariant feature.

30. The apparatus of claim 28, further comprising a scanning arrangement for directing said probe radiation from said emitter to said plane surface in a scan beam at an angle σ to said axis.

31. The apparatus of claim 30, wherein said scanning arrangement comprises a uniaxial scanner for varying angle σ by introducing an x-deflection $\gamma_x$.

32. The apparatus of claim 31, wherein said uniaxial scanner further comprises a scan arm having a uniaxial scan mirror and an X-driver for controlling said x-deflection $\gamma_x$.

33. The apparatus of claim 30, wherein said scanning arrangement comprises a biaxial scanner for varying said angle σ by introducing an x-deflection $\gamma_x$ and a y-deflection $\gamma_y$.

34. The apparatus of claim 33, wherein said biaxial scanner further comprises a scan arm having a biaxial scan mirror and an X-driver for controlling said x-deflection $\gamma_x$ and a Y-driver for controlling said y-deflection $\gamma_y$.

35. The apparatus of claim 27, wherein said emitter and said detector are offset.

36. The apparatus of claim 27, wherein said detector is positioned to receive said scattered portion at angle τ corresponding to a back-scatter angle such that said scattered portion is a back-scattered portion.

37. The apparatus of claim 36, further comprising a scanning arrangement for varying said angle τ.

38. The apparatus of claim 27, wherein said detector comprises a number of component detectors for detecting sub-portions of said back-scattered portion.

39. The apparatus of claim 27, further comprising an optic for shaping said probe radiation.

40. The apparatus of claim 27, further comprising a scanning arrangement having a number of scan arms for shaping said probe radiation into a corresponding number of scan beams.

41. The apparatus of claim 27, wherein said elongate object is selected from the group consisting of jotting implements, pointers, robotic arms and canes.

42. The apparatus of claim 41, wherein said jotting implements are selected from the group consisting of pens, pencils and styluses.

43. The apparatus of claim 27, wherein said computing unit is located on said elongate object.

44. The apparatus of claim 27, wherein said source is a single frequency emitter.

45. The apparatus of claim 44, wherein said single frequency emitter is a laser diode.

46. The apparatus of claim 27, wherein said source is an ambient radiation source and said probe radiation is an ambient radiation.

47. An elongate object having a tip contacting a plane surface having an invariant feature, said elongate object comprising:
- a) an emitter on said elongate object for illuminating said plane surface with a probe radiation at an angle $\sigma$ to an axis of said elongate object;
- b) a detector on said elongate object for detecting a scattered portion of said probe radiation returning from said plane surface to said elongate object at an angle $\tau$ to said axis;
- c) a computing unit for deriving a pose of said elongate object from a response of said scattered portion to said plane surface and to said invariant feature, and obtaining a position of said tip on said plane surface.

48. The elongate object of claim 47, wherein said computing unit converts said position to world coordinates such that said position is an absolute position.

49. A method for determining a position of a tip of an elongate object, said tip contacting a plane surface having an invariant feature, said method comprising:
- a) illuminating said plane surface and said invariant feature with a probe radiation;
- b) selecting an angle $\tau$ to an axis of said elongate object;
- c) detecting a scattered portion of said probe radiation arriving at said angle $\tau$ to said elongate object;
- d) deriving a pose of said elongate object from a response of said scattered portion to said plane surface and to said invariant feature; and
- e) obtaining said position from said pose and said invariant feature.

50. The method of claim 49, further comprising converting said position to world coordinates such that said position is an absolute position.

* * * * *